US007975227B2

(12) United States Patent
Covannon et al.

(10) Patent No.: US 7,975,227 B2
(45) Date of Patent: *Jul. 5, 2011

(54) SYSTEM AND METHOD FOR GENERATING A WORK OF COMMUNICATION WITH SUPPLEMENTAL CONTEXT

(75) Inventors: Edward Covannon, Ontario, NY (US); Joseph A. Manico, Rochester, NY (US); Loretta E. Allen, Hilton, NY (US); Patrick A. Cosgrove, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/699,114

(22) Filed: Feb. 3, 2010

(65) Prior Publication Data
US 2010/0138749 A1    Jun. 3, 2010

Related U.S. Application Data

(63) Continuation of application No. 11/324,681, filed on Jan. 3, 2006, now Pat. No. 7,694,226.

(51) Int. Cl.
*G06F 17/00* (2006.01)
(52) U.S. Cl. ........................ 715/731; 707/608
(58) Field of Classification Search .............. 707/708, 707/726, 758, 769, 771, 773, 780, 608; 715/200, 715/700, 707, 708, 731
See application file for complete search history.

(56) References Cited

U.S. PATENT DOCUMENTS

| 5,659,793 | A | 8/1997 | Escobar et al. |
| 5,873,107 | A | 2/1999 | Borovoy et al. |
| 6,782,393 | B1 | 8/2004 | Balabanovic et al. |
| 7,694,226 | B2 * | 4/2010 | Covannon et al. ............ 715/731 |
| 2003/0097636 | A1 | 5/2003 | Cleveland |
| 2003/0105589 | A1 | 6/2003 | Liu et al. |
| 2003/0236625 | A1 | 12/2003 | Brown et al. |

(Continued)

FOREIGN PATENT DOCUMENTS

EP     0 902 380     3/1999

(Continued)

OTHER PUBLICATIONS

Hulse et al, The Knowledge Authoring Tool: An XML-Based Knowledge Acquisition Environment, Engineering in Medicine and Biology Society, 2004, IEMBS '04 26$^{th}$ Annual Conf. of the IEEE, vol. 2, 2004, pp. 3350-3353.

(Continued)

*Primary Examiner* — Greta L Robinson
(74) *Attorney, Agent, or Firm* — Raymond L. Owens

(57) ABSTRACT

A system for selecting, managing, sharing and displaying content data files in a manner that takes into the account the contextual significance of said content data files to a narrative, an author(s) and an audience. A system that is able to place an absolute and relative value upon the significance of a media object is able to assist in stimulating the recollection of the author and audience, thus making every aspect more memorable and enhancing by improving the ease of use and the quality of the final result of the use of the system of this invention.

20 Claims, 22 Drawing Sheets

U.S. PATENT DOCUMENTS

2004/0017390 A1    1/2004    Knowlton et al.
2004/0201610 A1    10/2004    Rosen et al.
2005/0154737 A1    7/2005    O'Donnell
2007/0094250 A1*    4/2007    Kapur ............................. 707/5

FOREIGN PATENT DOCUMENTS

WO    WO 2005/076154    8/2005
WO    WO 2006/015337    2/2006

OTHER PUBLICATIONS

Miyata et al, Query Expansion Using Fuzzy Abductive Inference for Creative Thinking support system, Fuzzy System Proceedings, 1999, IEEE World Congress on Computational Intelligence, the 1998 IEEE International Conference on, vol. 1, May 4-9, 1998 pp. 189-193, vol. 1.

* cited by examiner

| KNOWLEDGE BASE | |
|---|---|
| UNIQUE ID | A UNIQUE ID FOR THIS INDIVIDUAL |
| GROUPING ID | A UNIQUE ID ASSIGNING THIS PERSON TO A GROUP |
| NAME (OR NAME HISTORY IF MORE THAN ONE) | |
| ADDRESS/TELEPHONE HISTORY | LINKS |
| BIRTH DATE/LOCATION | LINKS |
| NATIONALITY/CITIZENSHIP | LINKS |
| GENDER/SEXUAL ORIENTATION | LINKS |
| RACE | LINKS |
| CREED/BELIEF HISTORY | LINKS |
| MARITAL HISTORY | LINKS |
| MARITAL PARTNER | LINKS |
| CHILDREN | LINKS |
| PARENTS | LINKS |
| OTHER RELATIONS n+1 | LINKS |
| COWORKERS n+1 | LINKS |
| FRIENDS n+1 | LINKS |
| PROFESSION n+1 | LINKS |
| EDUCATIONAL HISTORY | LINKS |
| MILITARY HISTORY | LINKS |
| MEDICAL HISTORY | LINKS |
| WORK HISTORY | LINKS |
| PROFESSIONAL SOCIETIES | LINKS |
| HOBBIES/ACTIVITIES | LINKS |
| EVENTS/HONORS n+1 | LINKS |
| PERSONAL DATABASES (ONLINE AND PHYSICAL) | LINKS |

FIG. 7

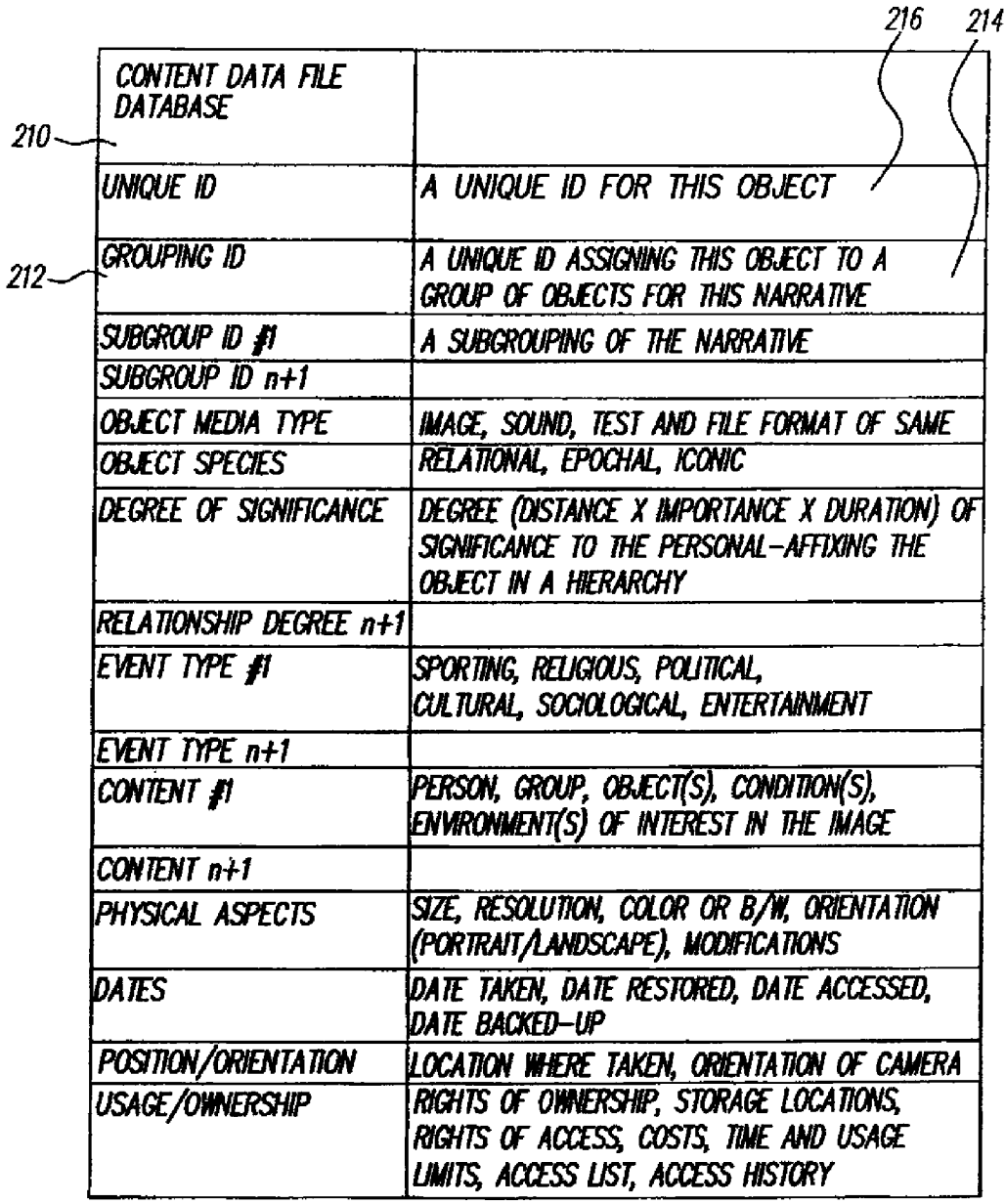

| CONTENT DATA FILE DATABASE | |
|---|---|
| UNIQUE ID | A UNIQUE ID FOR THIS OBJECT |
| GROUPING ID | A UNIQUE ID ASSIGNING THIS OBJECT TO A GROUP OF OBJECTS FOR THIS NARRATIVE |
| SUBGROUP ID #1 | A SUBGROUPING OF THE NARRATIVE |
| SUBGROUP ID n+1 | |
| OBJECT MEDIA TYPE | IMAGE, SOUND, TEST AND FILE FORMAT OF SAME |
| OBJECT SPECIES | RELATIONAL, EPOCHAL, ICONIC |
| DEGREE OF SIGNIFICANCE | DEGREE (DISTANCE X IMPORTANCE X DURATION) OF SIGNIFICANCE TO THE PERSONAL-AFFIXING THE OBJECT IN A HIERARCHY |
| RELATIONSHIP DEGREE n+1 | |
| EVENT TYPE #1 | SPORTING, RELIGIOUS, POLITICAL, CULTURAL, SOCIOLOGICAL, ENTERTAINMENT |
| EVENT TYPE n+1 | |
| CONTENT #1 | PERSON, GROUP, OBJECT(S), CONDITION(S), ENVIRONMENT(S) OF INTEREST IN THE IMAGE |
| CONTENT n+1 | |
| PHYSICAL ASPECTS | SIZE, RESOLUTION, COLOR OR B/W, ORIENTATION (PORTRAIT/LANDSCAPE), MODIFICATIONS |
| DATES | DATE TAKEN, DATE RESTORED, DATE ACCESSED, DATE BACKED-UP |
| POSITION/ORIENTATION | LOCATION WHERE TAKEN, ORIENTATION OF CAMERA |
| USAGE/OWNERSHIP | RIGHTS OF OWNERSHIP, STORAGE LOCATIONS, RIGHTS OF ACCESS, COSTS, TIME AND USAGE LIMITS, ACCESS LIST, ACCESS HISTORY |

FIG. 8

| DESIGNATED CONTENT DATA FILES DATABASE | |
|---|---|
| UNIQUE ID | A UNIQUE ID FOR THIS OBJECT |
| GROUPING ID | A UNIQUE ID FOR THE GROUP CONTAINING THIS OBJECT |
| SUBGROUP ID #1 | |
| SUBGROUP ID n+1 | |
| OBJECT SPECIES | RELATIONAL, EPOCHAL, ICONIC |
| DEGREE OF SIGNIFICANCE | DEGREE (DISTANCE X IMPORTANCE X DURATION) OF SIGNIFICANCE TO THE PERSONAL-AFFIXING THE OBJECT IN A HIERARCHY |
| EVENT TYPE #1 | WORK, FAMILY, EDUCATION, PASTIMES/HOBBIES, ENTERTAINMENT/LEISURE |
| EVENT TYPE n+1 | |
| CONTENT #1 | PERSON, GROUP, OBJECT(S), CONDITION(S), ENVIRONMENT(S) IN THE IMAGE |
| CONTENT n+1 | |
| PHYSICAL ASPECTS | SIZE, RESOLUTION, COLOR OR B/W, ORIENTATION (PORTRAIT/LANDSCAPE), MODIFICATIONS |
| DATES | DATE TAKEN, DATE MODIFIED, DATE LAST ACCESSED, |
| POSITION/ORIENTATION | LOCATION WHERE TAKEN, ORIENTATION OF CAMERA |
| USAGE/OWNERSHIP | OWNER OF THE IMAGE |

FIG. 9

| PRODUCT DATABASE | PRODUCT UNIQUE ID #1 | N+1 |
|---|---|---|
| PRODUCT ID | UNIQUE ID FOR THIS PRODUCT | |
| CUSTOMER | CUSTOMER FOR THIS PRODUCT | |
| CREATOR | CREATOR OF THIS PRODUCT | |
| CUSTOMER CRITERIA #1 | THE NARRATIVE FOCUS FOR THIS PRODUCT (PERSON, RELATIONSHIP, EVENT, LOCATION) | |
| CRITERIA n+1 | OTHER FOCI, FUNCTION OF THIS PRODUCT | |
| LINKS DATABASE | THE STORAGE ADDRESS FOR THE LINKS TO OBJECTS FOR THIS PRODUCT | |
| PRODUCT MEDIA TYPE | PRINT, ELECTRONIC–IF ELECTRONIC– FILE FORMAT | |
| INTERACTIVE FLAG | IS PRODUCT INTERACTIVE–IF SO–OPERATING SYSTEM AND LANGUAGE | |
| PRODUCT FORMAT | SIZE, LENGTH, RESOLUTION, COLOR/BW, PORTRAIT/LANDSCAPE | |
| PRODUCT STORAGE LOCATION(S) | LOCATION OF PRODUCT MASTER | |
| RIGHTS USAGE | COPYING PERMITTED, AMOUNT OF COPYING, FOR WHAT TYPES OF MEDIA AND BROADCAST DISTRIBUTION WHAT TYPES OF MEDIA AND BROADCAST DISTRIBUTION | |
| BASIC PRICE | | |
| ADDITIONAL SERVICES | ARCHIVING, USAGE MONITORING, SECURITY, SHIPPING (MEANS AND LOCATIONS), PACKAGING | |
| FINAL PRICE | | |

FIG. 10

| | | |
|---|---|---|
| LINK DATABASE | LINK ID #1 | N + 1 |
| LINK ADDRESS | A UNIQUE STORAGE LOCATION ASSOCIATED WITH THIS OBJECT | |
| GROUPING ID | A UNIQUE ID ASSIGNING THIS OBJECT TO A GROUP OF OBJECTS FOR THIS NARRATIVE | |
| SUBGROUP ID #1 | A SUBGROUPING OF THE NARRATIVE | |
| SUBGROUP ID n+1 | | |
| OBJECT MEDIA TYPE | | |
| RELATIONSHIP DEGREE/TYPE | DEGREE OF SIGNIFICANCE FROM THE PERSONAL-AFFIXING THE OBJECT IN A HIERARCHY | |
| EVENT TYPE #1 | SPORTING, RELIGIOUS, POLITICAL, CULTURAL, SOCIOLOGICAL, ENTERTAINMENT | |
| EVENT TYPE n+1 | | |
| EVENT SIGNIFICANCE | RELATIVE SIGNIFICANCE OF EVENT TO NARRATIVE | |
| CONTENT #1 | PERSON, GROUP, OBJECT(S), CONDITION(S), ENVIRONMENT(S) IN THE IMAGE | |
| CONTENT n+1 | | |
| CONTENT SIGNIFICANCE | RELATIVE SIGNIFICANCE OF THE CONTENT TO NARRATIVE | |
| PHYSICAL ASPECTS | SIZE, RESOLUTION, COLOR OR B/W, ORIENTATION (PORTRAIT/LANDSCAPE), MODIFICATIONS | |
| DATES | DATE TAKEN | |

SYSTEM AND METHOD FOR GENERATING A WORK OF COMMUNICATION WITH SUPPLEMENTAL CONTEXT

CROSS-REFERENCE TO RELATED APPLICATIONS

This application is a continuation of prior U.S. patent application Ser. No. 11/324,681, filed Jan. 3, 2006, now U.S. Pat. No. 7,694,226 which is hereby incorporated herein by reference in its entirety.

FIELD OF THE INVENTION

The present invention relates to the field of authoring works of communication, and in particular the creation, sharing and production of works of communication.

BACKGROUND OF THE INVENTION

Storytelling is an age-old art. All people tell stories in one form or another and much of human communication is intended to provide some form of story. However, some people are better storytellers than others. One of the differences between a good storyteller and a better storyteller is that the better storyteller tells stories in a way that the audience finds memorable. To accomplish this, the better storyteller takes care to tell the story in a way that ensures that the audience understands the contextual framework of the story. For the audience, this contextual framework makes the work of communication more vivid through providing more detail. The contextual framework also makes a work of communication easier to interpret properly (in line with the intention of the author) and thus more comprehensible. Further, it is widely accepted that ease and completeness of contextual recollection on the part of the creator and the audience provides an important contribution to the success of a work of communication.

A contextual framework typically takes the form of context information. Context information is information that is not strictly necessary to convey the narrative content of the story but that adds background and environmental details that help to draw an audience into the story so that the audience will better appreciate the story. By overcoming the context disparities that result from differences in age, social class, nationality, gender and race; the effective storyteller generates a message that communicates significance as well as abstract information. For example, the value of a contextual framework can be seen in knowing that a conversation is taking place in a white, hospital room with starched linen sheets and that the air is filled with the smell of rubbing alcohol and the linoleum is old and cracked. The context information modifies the core message in a manner that a simple retelling of the narrative of the conversation in the abstract does not.

Another reason contextual information makes a work of communication more memorable is that contextual information can allow the work of communication to be related to the actual experience of a person in an audience. For example, the aforementioned hospital room is located on the "Left Bank" of Paris. For people who have spent time on the "Left Bank" of Paris (or have vicariously experienced life in that location) then the communication of that information will stimulate a cache of memories related to such experiences. This makes the work of communication more memorable.

Although the preceding points are familiar to those versed in the arts, there is a notable lack of technological solutions to automatically assist a storyteller in authoring works of communication that show due consideration for these points.

Specifically, it will be appreciated that modern storytellers have a wide variety of computer and other tools such as video editors, word processors, audio mixers and the like that they can use to author works of communication that convey a story. These tools allow even novice storytellers to generate works of communication in a wide variety of forms. For example, a modern storyteller equipped with a conventional personal computer is capable of generating a work of communication that can take the form of printed output or other form of output expressed on a tangible medium of expression. However, such a storyteller is also empowered to create a wide variety of forms of data that can be used to recreate any performance or human or computer creation. Such a storyteller is empowered to create a work of communication that can comprise data that can be used at least in part in the process of generating output that can be presented to others such as characters, narrative or content that is used by a computer game, simulation or animation or other interactive experience. Accordingly, it will be appreciated that such a storyteller is capable of creating a work of communication that can include without limitation the content of one or more books, lectures, presentations, movies, stories, musical pieces, paintings, photos, dramas, animations, computer animations or computer generated videos, computer simulation data, or and audio content.

However, the modern authoring tools that enable such a storyteller to work in such a broad variety of mediums do not address the issues noted above and do not help a storyteller to author a work of communication that will be memorable. What is needed, therefore, are systems and methods that do so. For example, a typical obstacle to the use of technology in telling a memorable story is that human memory is generally far more efficient at extracting items of significance out of the vast collection of items of potential significance. However, the skillful use of memory assumes skills related to association, skills of knowledge and skills of recollection. One or more of these aspects of human memory may be deficient or impaired. These deficiencies may limit a storyteller's ability to recall contextual information that may be of particular use in making a work of communication that is memorable. Such modern editing tools and the like can do nothing to assist a storyteller under such circumstances. Similarly, modern authoring tools do nothing to help a storyteller to tell stories in a way that will be necessarily understood and appreciated in view of contextual frameworks that are already appreciated by the audience.

It will also be appreciated that better storytellers spend a great amount of time composing their stories to ensure that each story includes a proper mix of contextual information and narrative content and/or to ensure that the narrative content is told in a manner that resonates with contextual understandings of the audience. This, in turn, requires a significant amount of skill on the part of the storyteller and requires that the storyteller invest large amounts of time and effort in preparing material for presentation. Given the competing time demands imposed by modern life upon the time of casual and recreational storytellers, such storytellers will benefit from a system and method that can reduce the amount of time required to incorporate appropriate amounts and types of context into a work of communication.

SUMMARY OF THE INVENTION

The invention is defined by the claims. In some of the broader aspect of the invention a method and a system are provided for authoring a work of communication.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

FIG. 7 shows a knowledge base for an associated person.

FIG. 8 shows a criteria and related fields of data associated with a content data file, said criteria and data fields being useful in providing a database having similar criteria and data fields for other content data files;

FIG. 9 shows criteria and related data fields associated with one content data file from a set of content data files designated for use in a work of communication; said criteria and data fields being useful in providing a database having similar criteria and data fields for other of the content data files from the designated set of content data files;

FIG. 10 shows criteria and related data fields associated with one possible output product, said criteria and data fields being useful in providing a database having similar criteria and data fields for other possible output products;

FIG. 11 shows a linkage database.

DETAILED DESCRIPTION OF THE INVENTION

Figure 1:
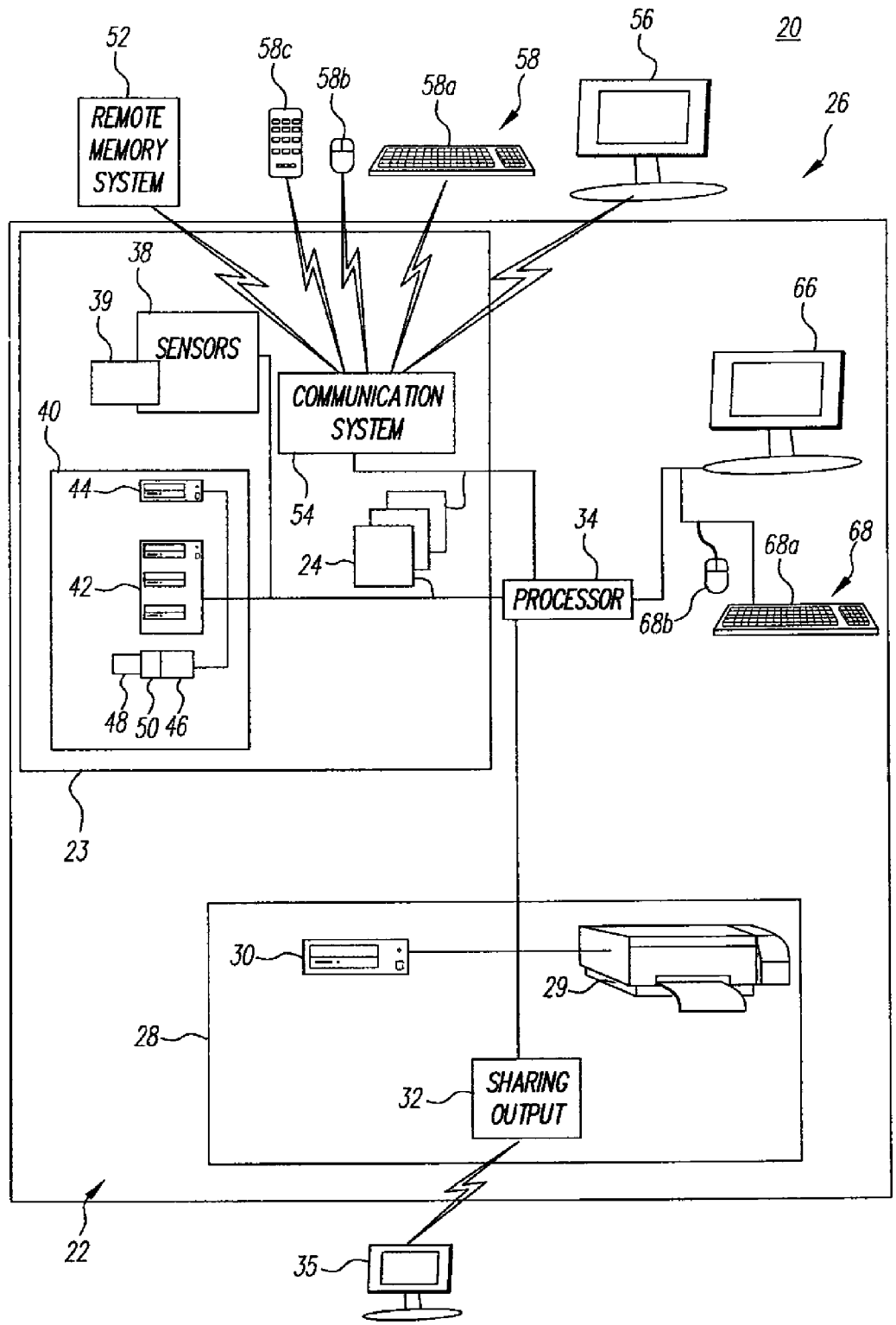
FIG. 1 shows an embodiment of the system.

The following is a detailed description of preferred embodiments of the invention, reference being made to the drawings in which the same reference numerals identify the same elements of structure in each of the several figures. FIG. 1 illustrates a first embodiment of an electronic system 20 for generating a work of communication. In the embodiment of FIG. 1, electronic system 20 comprises a housing 22 and a content input system 23 that is a source of content data files 24, a user input system 26 and an output system 28 connected to a processor 34. Content input system 23, user input system 26 or output system 28 and processor 34 can be located within housing 22 as illustrated. In other embodiments, circuits and systems of content input system 23, user input system 26 or output system 28 can be located in whole or in part outside of housing 22.

Content input system 23 includes any form of electronic or other circuit or system that can supply digital data to processor 34 comprising still images, video graphics, that can be used to as at least a part of a basis for generating an output in a form that can be seen, heard or otherwise perceived by an audience member to whom the work of communication is presented. Content input system 23 can capture content data for use in content data files by use of capture devices located at electronic system 20 and can obtain content data files that have been prepared by or using other devices. In the embodiment of FIG. 1, content input system 23 includes sensors 38, a memory 40 and a communication system 54.

Sensors 38 are optional and can include light sensors, biometric sensors and other sensors known in the art that can be used to detect conditions in the environment of system 20 and to convert this information into a form that can be used by processor 34 of system 20. Sensors 38 can also include audio sensors 39 that are adapted to capture sounds. Sensors 38 can also include biometric or other sensors for measuring involuntary physical and mental reactions such sensors including but not limited to voice inflection, body movement, eye movement, pupil dilation, body temperature, and the p4000 wave sensors.

Memory 40 can include conventional memory devices including solid state, magnetic, optical or other data storage devices. Memory 40 can be fixed within system 20 or it can be removable. In the embodiment of FIG. 1, system 20 is shown having a hard drive 42, a disk drive 44 for a removable disk such as an optical, magnetic or other disk memory (not shown) and a memory card slot 46 that holds a removable memory 48 such as a removable memory card and has a removable memory interface 50 for communicating with removable memory 48. Data including but not limited to control programs, digital images and metadata can also be stored in a remote memory system 52 such as a personal computer, computer network or other digital system.

In the following, automated pattern classification is discussed. It will be understood that the invention is not limited in relation to specific technologies used for these purposes. For example, pattern classification can be provided by any of the following, individually or in comparison: rule based systems, semantic knowledge network approaches, frame-based knowledge systems, neural networks, fuzzy-logic based systems, genetic algorithm mechanisms, and heuristics-based systems.

In the embodiment shown in FIG. 1, system 20 has a communication system 54 that in this embodiment can be used to communicate with a remote memory system 52, a remote display 56, remote input 58. A remote input station including a remote input display 56 and/or remote input controls 58 (also referred to herein as "remote input 58") can communicate with communication system 54 wirelessly as illustrated or can communicate in a wired fashion. In an alternative embodiment, a local input station including either or both of a local display 66 and local input controls 68 (also referred to herein as "local user input 68") can be connected to communication system 54 using a wired or wireless connection.

Communication system 54 can comprise for example, one or more optical, radio frequency or other transducer circuits or other systems that convert image and other data into a form that can be conveyed to a remote device such as remote memory system 52 or remote display device 56 using an optical signal, radio frequency signal or other form of signal. Communication system 54 can also be used to receive a digital image and other data from a host or server computer or network (not shown), a remote memory system 52 or a remote input 58. Communication system 54 provides processor 34 with information and instructions from signals received thereby. Typically, communication system 54 will be adapted to communicate with the remote memory system 52 by way a communication network such as a conventional telecommunication or data transfer network such as the internet, a cellular, peer-to-peer or other form of mobile telecommunication network, a local communication network such as wired or wireless local area network or any other conventional wired or wireless data transfer system.

User input system 26 provides a way for an author of a work of communication to provide instructions to processor 34. This allows such an author to make a designation of content data files to be used in generating a work of communication and to select an output form for the work of communication. User input system 26 can also be used for a variety of other purposes including but not limited to allowing an author to arrange, organize and edit content data files to be incorporated into the work of communication, to provide information about the author or audience, to provide annotation data such as voice and text data, to identify characters in the content data files, and to perform such other interactions with system 20 as will be described later.

In this regard user input system 26 can comprise any form of transducer or other device capable of receiving an input from a user and converting this input into a form that can be used by processor 34. For example, user input system 26 can comprise a touch screen input, a touch pad input, a 4-way switch, a 6-way switch, an 8-way switch, a stylus system, a trackball system, a joystick system, a voice recognition system, a gesture recognition system a keyboard, a remote control or other such systems. In the embodiment shown in FIG. 1, user input system 26 includes an optional remote input 58 including a remote keyboard 58a, a remote mouse 58b, and a remote control 58c and a local input 68 including a local keyboard 68a and a local mouse 68b.

Figure 2A:
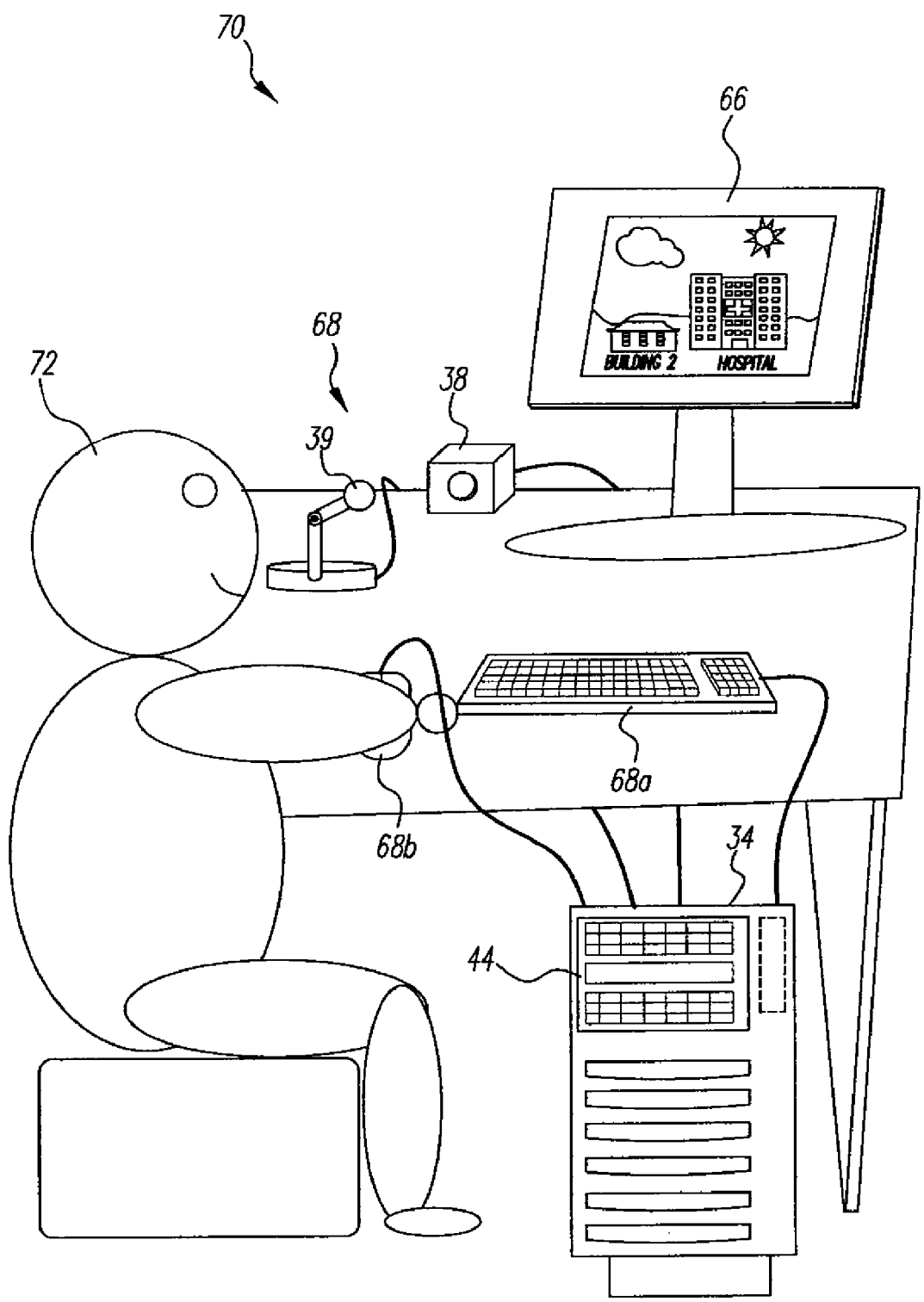
FIG. 2A shows a schematic view of a user input system and display in the form of a studio for use in authoring a work of communication.

Remote input 58 can take a variety of forms, including but not limited to the remote keyboard 58a, remote mouse 58b or remote control handheld device 58c illustrated in FIG. 1. Similarly, local input 68 can take a variety of forms. In the embodiment of FIG. 1, local display 66 and local user input 68 are shown directly connected to processor 34. As is illustrated in FIG. 2A, local user input 68 can take the form of an editing studio or kiosk 70 (hereafter also referred to as an "editing area 70"). In this illustration, an author 72 is seated before a console comprising local keyboard 68a and mouse 68b and a local display 66 which is capable, for example, of displaying multimedia content. As is also illustrated in FIG. 2A, editing area 70 can also have sensors 38 including but not limited to cameras, audio sensors 39 and other sensors such as multispectral sensors that can monitor author 72 during an authoring or production session.

Figure 2B:
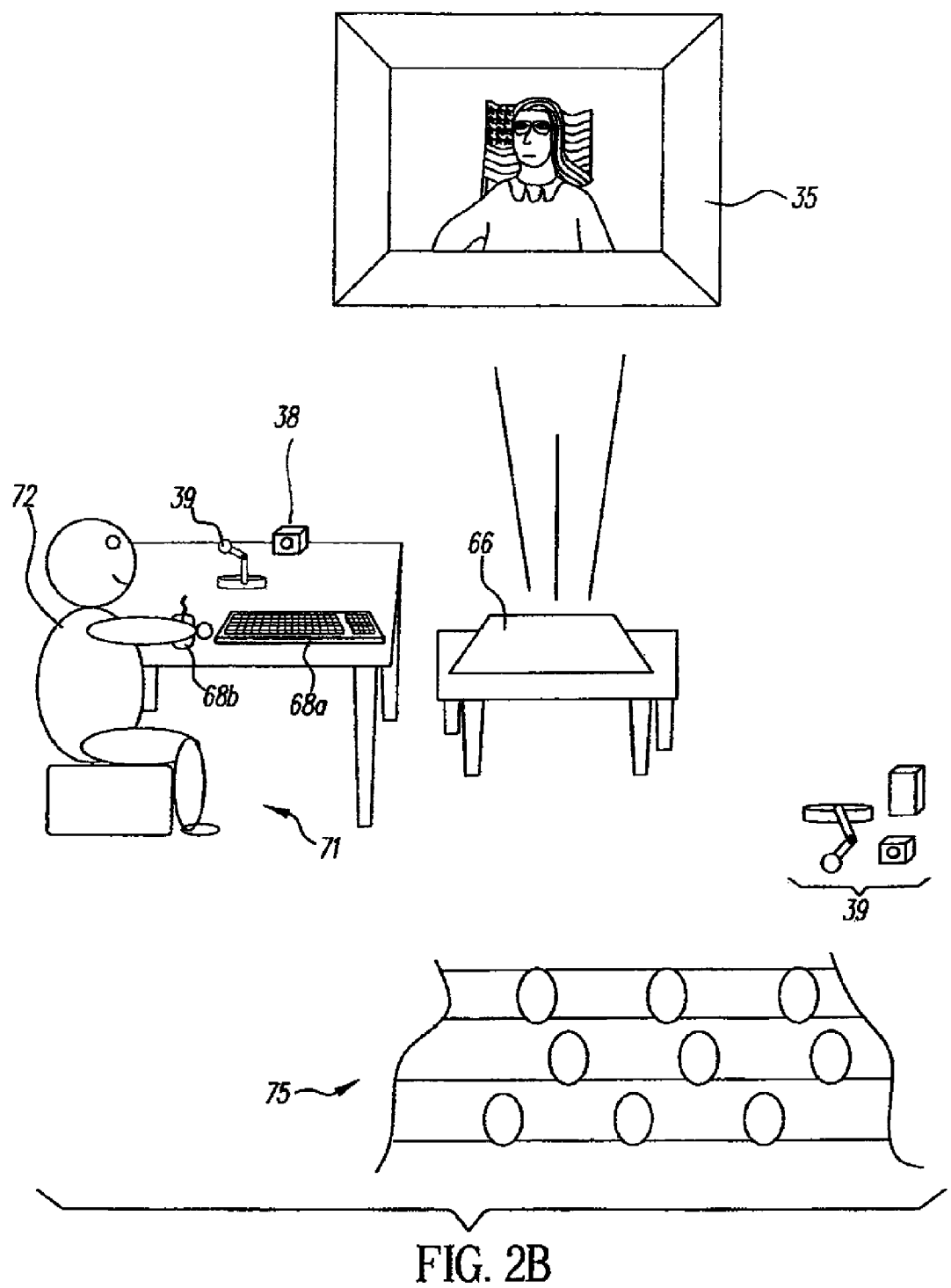
FIG. 2B shows a schematic view of a user input system and display in the form of a performance stage for use in authoring a work of communication.

As is illustrated in FIG. 2B, local user input 68 can also take the form of a performance stage 71. In this illustration, an author 72 is seated before a console comprising local keyboard 68a and mouse 68b and a local display 66, which is capable of multimedia display. As is also illustrated in FIG. 2B, performance stage 71 can also have sensors 38 including but not limited to cameras, audio sensors 39 and other sensors 38 such as multispectral sensors that can monitor author 72 during an authoring or production session. As is also illustrated in FIG. 2B, performance stage 71 has a sharing system 35 (also referred to herein as a "presentation system 35") that presents content to an audience 75 and a portion of sensors 38 that are adapted to monitor audience reaction to the presented content. It will be appreciated that the material presented to audience 75 can also be presented to remote viewers by a sharing output 32 (described in detail below).

Output system 28 is used to share or preserve an authored work of communication. In this regard, output system 28 can comprise any conventional structure or system that is known for these purposes and can include but is not limited to, a printer 29, a memory writer 30 and a sharing output 32. Printer 29 can record images on receiver medium using a variety of known technologies including, but not limited to, conventional four color offset separation printing or other contact printing, silk screening, dry electrophotography such as is used in the NexPress 2100 printer sold by Eastman Kodak Company, Rochester, N.Y., USA, thermal printing technology, drop on demand ink jet technology and continuous inkjet technology. For the purpose of the following discussions, printer 29 will be described as being of a type that generates color images. However, it will be appreciated that this is not necessary and that the claimed methods and apparatuses herein can be practiced with a printer 29 that prints monotone images such as black and white, grayscale or sepia toned images.

Memory writer 30 can comprise a memory interface or disk drive that is adapted to record digital data representing a work of communication in a form that can be used by an external device (not illustrated) such as a magnetic disk, optical disk or semiconductor memory. Sharing output 32 can comprise any circuit or system, such as a communication device, that is adapted to use a communication channel to transmit data representing a work of communication to a presentation system 35, such as a multimedia display that can be seen by an audience and is adapted to present the work of communication. Sharing output 32 can also comprise any circuit or system that provides an output to multisensory devices designed to stimulate more than just audio and/or visual sensory response in a viewer and that have a measurable improvement upon the recollection of the author, performers and audience. Examples of such multisensory devices include but are not limited to haptic feedback, motion feedback, olefactory feedback systems known to those of skill in the art.

It will be appreciated that in certain embodiments content input system 23, user input system 26 and output system 28 can share components. For example, communication system 54 can be used to facilitate communication by serving as a part of sharing output 32 or by receiving user input signals from remote user input 58. In another example, removable disk drive 44 or memory interface 46 can be used as a memory writer 30.

Processor 34 operates system 20 based upon signals from user input system 26, sensors 38, memory 40 and communication system 54. Processor 34 can include, but is not limited to, a programmable digital computer, a programmable microprocessor, a programmable logic processor, a series of electronic circuits, a series of electronic circuits reduced to the form of an integrated circuit, or a series of discrete components.

Figure 3:
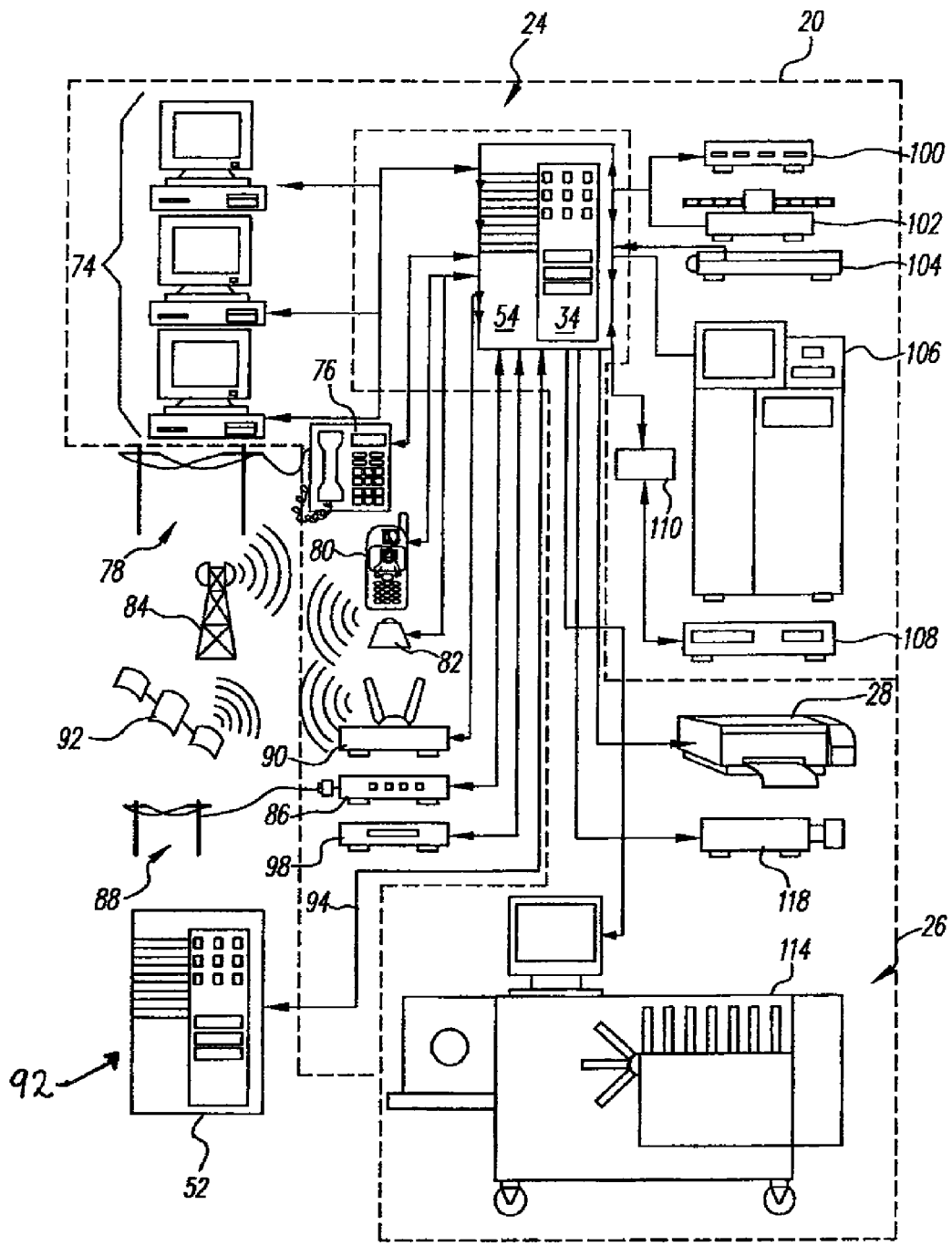
FIG. 3 shows another embodiment of the system.

FIG. 3 illustrates another embodiment of system 20. In this embodiment, source of content data files 24 comprises a set of docking stations 74, intermittently linked external digital capture and/or display devices, a connection 76 to a wired telecommunication system 78, a cellular phone 80 and/or a wireless broadband transceiver 82 providing wireless connection to a wireless telecommunication network 84. A cable link 86 provides a connection to a cable communication network 88 and a dish satellite system 90 provides a connection to a satellite communication system 92. An Internet link 94 provides a communication connection to a remote memory 52 in a remote server 96. A disk player 98 provides access to content recorded on an optical disk.

Also in this embodiment, source of content 24 is shown as incorporating capture devices that are capable of scanning printed or other medium such as film that are provided at system 20. In this embodiment these capture devices include photographic film scanners 100 and 102, which can be adapted to scan still image films or motion picture films, negatives, slides and prints. A scanner 104 is provided that can scan film, paper, other two dimensional or three dimensional objects. Such a scanner 104 can be used for inputting historical data (documents of which typical examples are report cards and school transcripts, letters, medical and military records) as well as photos, drawings, and other non-written historical documentation. A photofinishing system 106 is provided that can process and scan photographic films. Finally, in this embodiment an analog to digital converter 110 is provided to convert image signals that are provided in analog form, such as video cassettes or audio cassettes that can be played on an appropriate cassette player 108.

The embodiment illustrated in FIG. 3 also shows output system 26 illustrated as comprising a printer 29, a photofinishing printer 114 and a projection system 118.

Figure 4:
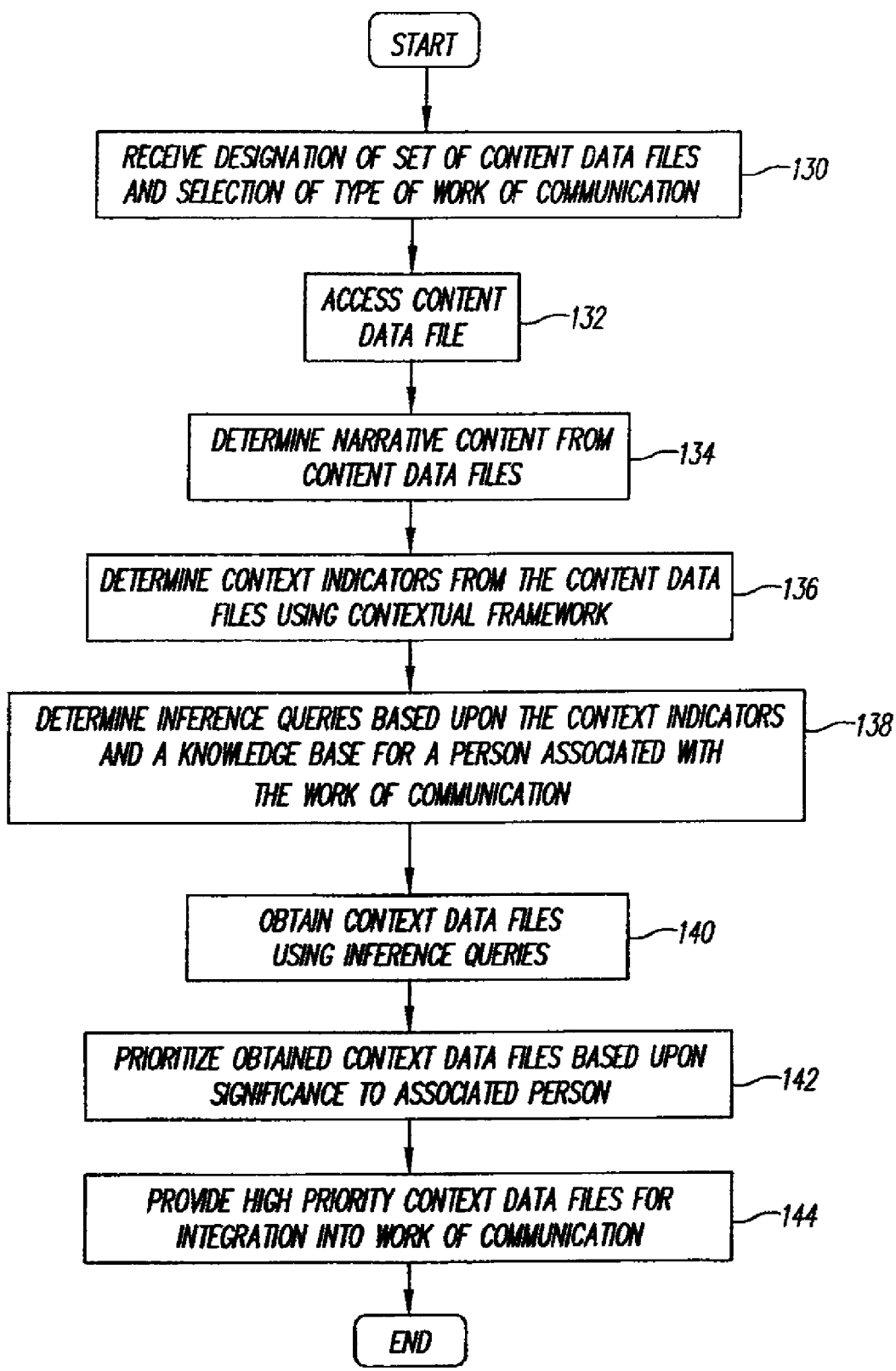
FIG. 4 shows one method for authoring a work of communication.

Turning now to FIG. 4, what is illustrated is a first embodiment of a method for authoring a work of communication using electronic system 20. In accordance with the embodiment of FIG. 4, the process begins when processor 34 receives instructions from an author of the work of communication including a designation of a set of content data files and a selection of an output form for the work of communication. Typically author 72 will provide such instructions by way of user input system 26. However, such instructions can also be received from signals that are provided to communication system 54 (step 130).

In one embodiment of the invention, the set of content data files can be designated by providing a listing of content data files along with information that allows processor 34 to access the content data files. The access information can include, for example, file name and location information and optionally can include identification and authentication information allowing access to securely stored content data files. Alternatively, the content data files can be designated by providing the set of content data files as a group to processor 34. This can be done for example by loading an optical disk that has the selected set of content data files stored thereon into removable disk drive 44 or loading a digital camera or display device into a docking station 74.

Processor 34 then accesses designated content data files (step 132). Typically, this involves downloading digital data representing the content data files into memory 40 for ready access during generation of a work of communication. As noted above such access may require processor 34 to provide identification and authentication information and may require processor 34 to coordinate with communication system 54 to obtain data.

Processor 34 then determines narrative content from the content data files based upon the selected output form (step 134). In many circumstances, processor 34 will determine that the narrative content includes all of the content from the content data files. However, in other circumstances an author may supply more content than can be incorporated into a selected output form. In such circumstances the system may have to selectively exclude portions of the content from the content data files.

Processor 34 then determines inference queries from the content data files and personal information (steps 136-142) and uses the inference queries to obtain context data files (also referred to herein as "CDFs") from the source of content data files (step 144).

In a first step of the process of determining inference queries, context indicators are located in the accessed content data files based upon a contextual framework of rules for identifying such content (step 136). In this embodiment, the context indicators comprise any of a wide variety of types of data that can be found through analysis of the content data files. Such context indicators can provide any of a number of different pieces of information that can provide some useful suggestion as to the context of a set of content data files. The following is generally directed to use of a single contextual framework with a particular work of communication. This is a matter of convenience in explanation. One or more contextual frameworks can be used, subject to the proviso that each additional contextual framework imposes an additional computation burden.

Various rules are used to identify context indicators in a content data file and for conceptual clarity, rules that are used to identify context indicators can be organized into contextual frameworks of categories of related context indicators and associated rules for determining such context indicators. Context indicators are elements of semantic information determined from an analysis of one or more portions of data in a content file. The term "semantic information" is used herein to refer to the meaning of a particular portion of data as interpreted by a human observer. For example, semantic information refers to the meaning of a word or phrase in a text document or the interpretation of a particular pattern of light and shadow in an image as a pair of eyes. In a contextual framework, context indicators are particular items of semantic information that are identified by the associated rules as being relevant to the identified context. An individual contextual framework is, thus, inclusive of some of the semantic information potentially available in a content data file and exclusive of other semantic information potentially available. The general nature of the included semantic information can be indicated by a designation of a category of human contexts, as in the following examples.

One example of a contextual framework is a chronological contextual framework, that is, a framework of rules related to chronology that identify the chronological context of the set of content data files. For example, one rule can cause processor 34 analyze the content data files to determine a range of dates and times over which the set of content files were captured, another rule can examine each content data file to try to associate the set of content data files with a time of day, still another rule can cause processor 34 to analyze the content data files to determine a time of day that a particular event occurred, and yet another can cause processor 34 to determine the time of year in which the set of content data files were created. A chronological framework can also include rules that cause processor 34 to determine whether the set of content data files represents a single event or a sequence of different events and/or for organizing the set of content data files into event groups. Methods for making such an event based clustering of content data files are well known. Such chronological indicators might be found in metadata associated with selected content data files, such as date and time information, or by way of analyzes of the content of the content data files for chronological indicators such as image, text or audio elements that are known to connote chronological happenings such as major holidays or events marking rites of passage such as birthdays and the like. Metadata and analyzes of content can also be used in combination with additional information provided by the rules of the contextual framework. For example, date information can be checked using rules that include a table of holidays. This same approach applies to other types of contextual framework.

Another example of a contextual framework is an environmental contextual framework that incorporates rules for locating environmental context indicators within the content data files. Such environmental context indicators generally describe rules for determining ambient conditions within which a narrative is told, for example, rules for determining weather conditions, daylight and indoor/outdoor status can be applied. Environment indicators, like chronological indicators, can be determined from metadata and analyses of content, and by use of additional outside information. For example, metadata on white balance can indicate indoor/outdoor status, exposure level can indicate light or dark outdoor conditions. Alternatively, time and date information, in combination with geopositioning information, such as data provided by the Global Positioning System (GPS) can be used in combination with rules that access an outside database of weather information to determine weather conditions at the time particular content was created.

Still other examples of a contextual framework include, but are not limited to a social framework that defines rules for location, social context indicators in the content data files such as groupings of people depicted therein. For example, family groupings, school groupings, work groupings and the like can be identified using appropriate rules.

Other contextual frameworks can be provided, for example, political and technological contextual frameworks can include, as context indicators, political figures or indicia of technological development, respectively. These context indicators can be selected by rules that access an outside database using other context indicators, such as: location, date, and the like.

Other types of contextual frameworks include: athletic, educational, and geographic. Contextual frameworks can combine or subdivide different types to meet particular needs. For example, an athletic and educational contextual framework can be provided. Likewise, an athletic contextual framework can be replaced by separate contextual frameworks for different sports. Contextual frameworks can be global, that is, usable by all users in all circumstances, or can be limited in application. For example, contextual frameworks can be provided that are specific to a particular author, subject, type or work of communication, manner of creation, or manner of use.

Contextual rules used in determining and prioritizing context indicators can be binary or probabilistic. For example, a single contextual rule or group of rules can be provided in the form of a Bayesian net. Contextual rules, and context indicators used in a particular contextual framework can be determined heuristically or by use of automated classification techniques, such as use of a genetic algorithm. Use of these techniques are well known to those of skill in the art.

Inference queries are then obtained by applying determined context indicators to a knowledge base for at least one person who is associated in some way with the work of communication (step 138). Such an associated person can comprise, for example, the author of the work of communication, a performer who presents the work of communication or participates in presenting the work of communication or one or more members of an audience of the work of communication. For this purpose, such an associated person can also include, for example, a character depicted in the work of communication including a person, fictional character or any other anthropomorphic representation contained within the work of communication. There can be one or more than one associated person such as an audience. For convenience in explanation, the knowledge base is generally discussed herein in relation to a single person.

The knowledge base for the associated person is stored in memory 40, external memory 52 or any other data storage device with which system 20 is in communication. The knowledge base contains reference information about the relevant person that is accessed using the determined context indicators. The reference information comprises information, such as biographical information, about the relevant person including but not limited to educational information, professional information, social information and the like. The reference information is used in combination with context indicators to form inference queries that are used to search for context data files.

For example, the reference information can include educational history for a person. The educational history can identify schools attended by the relevant person and the years of attendance. If a context indicator suggests that the set of content data files were captured during a particular year and the knowledge database indicates that the associated person was attending a particular school during that year, then inference queries can be generated for content data files that are related to the school and/or people who attended the school during the relevant year.

The inference queries are then used to obtain context data files from the source of content data files 20 (step 140).

The significance of the obtained content data files is then determined and a priority is assigned (step 142). The determination of significance is based upon the nature of the context data files found during the search and the relationship of the context data files to the associated person. A higher priority is given to context data files depicting content having a greater level of immediacy for or closer relationship to the associated person. Thus, in the above described search for school related context data files, those context data files having content that depicts the present appearance of the school might be given lower priority than context data files that present subject matter from the years in which the associated person attended that school. Similarly, content data files actually depicting the relevant person at the time and at the school would be determined to be of still higher significance and thus given greater priority.

There are a number of means of measuring significance. Any system of significance measure can be used. The following discussion is directed to a particular example of such a system, in which psychological significance is measured using such as Maslow's Hierarchy of needs as described in Abraham H. Maslow, Motivation and Personality (1954). The psychological significance is then multiplied by intensity, ubiquity and duration to provide a product that will be referred to as the absolute significance. It should be noted that other forms of gauging significance (social, economic, historical, political and so on) may be equally or more appropriate depending on the needs of the author.

It should be particularly noted that in addition to inputs from databases stored on memory 40, system 20 allows immediate sorting of content data files by significance to the author, performers, audience, narrative and characters within the narrative. This enables the editing area 70 to have the form of a personal monitoring image and sound capture device that runs continuously, and in conjunction with sensors and monitors, is able to select events and objects of significance as they present themselves to an individual and capture or otherwise record those objects and events.

After being located, the context data files are provided for inclusion in the work of communication (step 144). All of the located context data files can be provided, however, this can result in a very large number of context data files. Alternatively, context data files provided for inclusion can be limited in some manner. For example, context data files can be limited to a predetermined metric, such as number of context data files or total size or to those that have a priority greater than a minimum level of priority. The metric used can be determined heuristically and can vary depending upon factors, such as the contextual framework, the associated person, the subject, type or work of communication, manner of creation, and manner of use. In the embodiment of FIG. 4, only those context data files meeting a predetermined priority metric are provided for integration into the work of communication. This can be done by providing only such context data files to author 72 so that the author 72 can manually select from the context data files for incorporation in the work of communication those context data files that the author prefers. Alternatively, located context data files meeting the predetermined metric can be automatically incorporated into the work of communication to provide context as necessary.

Figure 5:
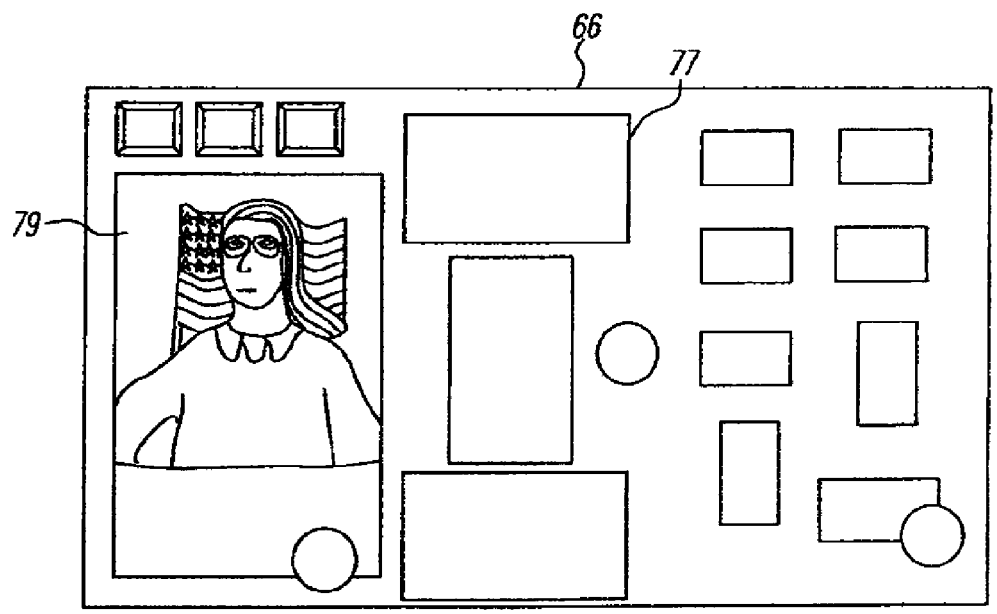
FIG. 5 shows a view of a display device with representations of content data files presented thereon.
Figure 6:
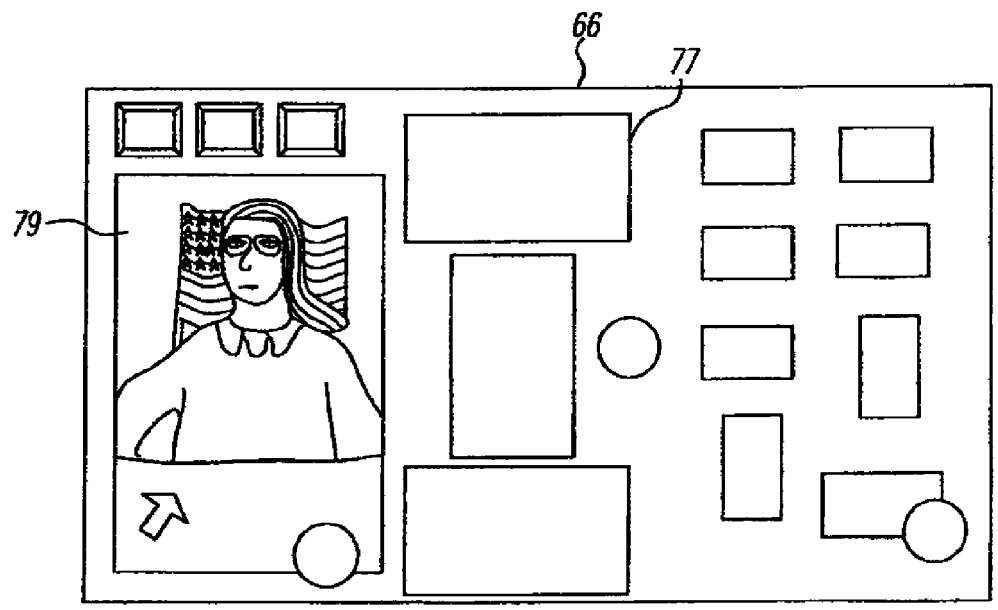
FIG. 6 shows a view of a display device presenting representations of content data files and an indicator used to indicate a selection of one of the representation context datafiles presented thereon.

In one example of use of system 20, an author 72 is stationed on performance area 71 illustrated in FIG. 2B and recounting incidents in her life. As author 72 speaks, audio capture system 39 senses the voice signals, converts the voice signals into a content data file. Processor 34 then determines a narrative content associated with the content data file (step 134) analyzes the content data file in accordance with the rules of one or more contextual frameworks to determine context indicators (step 136). The context indicators are then applied to a knowledge base for the author 72 to obtain inference queries (step 138) and the inference queries are used to obtain contextual data files (step 140) that are significant to the associated person, in this case, the author. Because of the manner in which the contextual data files are located, the contextual data files are also significant to the narrative content of the storytelling performance. In this example, the contextual data files are media objects that are automatically provided for inclusion in the work of communication (step 142). For example, where author 72 is presenting her story on a performance stage 71 as illustrated in FIG. 2B, this can be done by providing author 72 with a presentation of representations of content data files on a local display 66. One example of such a presentation is illustrated in FIG. 5, which shows local display 66 presenting a plurality of content data files 79 to author 72. As is illustrated in FIG. 6, author 72 can choose by use of a cursor C driven by local mouse 68b, or other user input device to share one of the content data files 79 with audience 77 or can respond to the presentation of content data files 79 by adding to or changing the direction of the story. As author 72 speaks of her experiences, maps, photos, documents, sounds and other content data files 79 can be presented to author 72. These contextual data files are provided without the formulation of a query by author 72. Author 72 can use the presented content data files as stimulants to memory and cues to further narration, can share the presented content data files with the audience, or can ignore the presented content data files, or do all of these at different times in a single performance.

It will be appreciated that in this way, communication, system 20 can provide contextual support in a manner that adds value and impact to the story being told by a work of communication. It should be noted that each time the storyteller recounts the same or a similar story, system 20 can be enable to capture the choices made by author 72 other performers (not shown) and/or audience 77 with the intent that such a history can be used to better anticipate and fulfill the needs of the author (or other performers) in telling the story.

FIGS. 7-14 show a particular embodiment of a method for creating a work of communication that uses a system of databases. FIG. 7 provides an example of a knowledge base 210 that contains the basic information about an individual or group that processor 34 can use for its function while FIGS. 8 and 9 provide various content data file databases, FIG. 10 shows one embodiment of a product database 230 that defines a structure for a work of communication; and FIG. 11 describes a link database 240 that associates the content data files for the purpose of producing a product that is a work of communication.

In FIG. 7, what is shown is a knowledge base structure 200 appropriate to describing an individual or group that is associated with a work of communication. As can be seen in FIG. 7, in this embodiment, knowledge base structure 200 comprises a series of data fields 202 of biographical and social information. Each data field 202 can store information directly and/or can be a logical link to another repository of stored data. A link 204 can be a null link that is used to null logical links to other repository of stored data.

Data can be entered into knowledge base structure entry can be created in ways both direct and indirect. Direct methods include asking questions of the individual or group or asking the individual or group to fill out a questionnaire. Indirect methods include searching an individual's or group's public records, monitoring the behavior of the individual or group and noting voluntary and/or involuntary responses to specific types of stimuli, and additionally, by deductively inferring information about the individual or group from information otherwise gathered. A behavioral, psychological knowledge base structure 200 can be stored on any memory that can be accessed by processor 34.

FIG. 8 shows a content data file database 210 useful in characterizing the content of available content data files. The content data file database is shown and discussed in terms of a relational table. This is done for the sake of clarity of communication. The criteria expressed in content data file database 210 are equally appropriate as search criteria for structured (regardless of structure) or unstructured repositories that have been generated in a "top down" or "bottom up" manner (terms familiar to those versed in the art of database design). Likewise the data may be implemented as tags (such as those used by SGML, HTML and similar language schemes), metatags integrated into the content data file, as pointers to the content data file, computer language coded relationships or generated linkages defined "on the fly" by system 20.

Each content data file in the content data database file 210, has or is assigned a unique identifier 216 hence referred to as an "ID." Associated with this unique ID are fields of content data file data that particularly enable system 20 to use the content data file. A content data file database 210 also has criteria 212 and associated fields 214.

One example of a criterion is a group ID. In addition to the unique ID, the content data file can be grouped with other content data files. Such groups can be useful in defining a context for a work of communication. This grouping can be accomplished by assigning a group ID to content data file database 210. For example, a content data file may be assigned to the group "birthdays." Such groups may be derived or imposed in a "top down" or "bottom up" approach as appropriate. Additionally there is no logical limit on the number of groups that a content data file may belong to or on the number of groups to which a group can belong. That is, a group may contain content data files or other groups of content data files without limit. For example, "birthdays" may belong to a larger group "happy times."

Typical (but not all inclusive) other criteria 212 and associated fields describe the nature of the content data file. Examples of such descriptions include: mpeg file audio, ".mov" video file, jpeg still picture, text file etc., such criteria 212 and fields 214 can also describe the resolution, size, duration (as appropriate) and so on of the content data file, the physical orientation of the content data file. For some types of content data files fields describing ownership and other usage rights may be present.

A content data file can also include "event type" criteria and associated data fields. Some examples of event types are: work, school, vacations, weddings, family, infancy, childhood, sports, games, and military service. A type may logically contain only itself or other types. For example, a type of "fun" may contain: play, sports, music, puzzle solving, gaming, hunting and so on.

Other useful criteria 212 are criteria 212 and associate fields 214 for the use of the content data file in a product or performance. Typical (but not all inclusive) of such criteria 212 and fields 214 are those that describe the content of a content data file. Examples of such descriptions and characterizations include descriptions such as landscape, pet, architecture, mother and so on. As noted, the field 214 may contain a fundamental entry or an entry that indicates participation in a larger group in a one-to-many or many-to-many bi-directional relation. For example, a field 214 may contain the "dog" and the grouping "pet" as well the grouping "dogs" in addition to entries for "play" and companion.

Time and place can be useful in criteria 212 in gauging the potential significance of a content data file. Time and place criteria are not limited to creation of the content data file. For example, in addition to the date and duration of right of usage of the media object (for example an image of a car) criteria can also be provided as to the duration of the content in the image (for example the car was model year 1972-1973), the duration of ownership (owned by the author 1972-1992) and absolute duration (in existence 1972-2002).

Various taxonomies and classifications can be applied as appropriate to support the specific application by those versed of skill in the art of database design. The taxonomy used acts as a contextual framework, determining context indicators using formulae that apply contextual rules to the criteria 212. Formulae can be determined in the same manner as rules of a contextual framework.

General significance is a function of a formula defined by an impact of content upon both the number of people, the severity of the impact, and the length and change over time of the impact. An example is a car not starting. The number of people impacted may be one, but depending upon the work of communication, the car not starting (and therefore an image of the car) may have no significant value to the story or the event may have very significant impact upon the entire turn of events in the story. For example, if the car not starting resulted in being unable to get to the church for a wedding and the person's life having been altered, the formulaic importance of the car for the work of communication would be very high. Thus, in the content data file database 210, a valuing of significance as a context indicator can be made based on number of people, change over time and severity and used to gauge the contextual value of a content data file. Likewise space and location can be important in gauging the significance of the content of the content data file.

FIG. 9 shows one embodiment of a database for content data files 220 that are designated to be incorporated in a work of communication, such a designated content data file database being any special case of content data file database 210 just described in FIG. 7. It is understood that the description of this as a discrete database is a convention useful for communication, and that the data may reside within a single database with fields that allow multiple views of that data which may reside in many more databases whose linkages provide the functional equivalent of the logical organization described here.

Although criteria 222 and fields 224 within selected content data file database 220 include the same base collection criteria and fields described in FIG. 8, the embodiment shows that selected groups of content data files can be of utility, in certain cases.

Specifically, two examples of useful selected content data file databases 220 are databases assembled on by sorting content data file on the basis of relative significance to the author, performers, the characters in the narrative and the audience. Since known relative significance to the author, performers, characters and audience is a useful quality for the purpose of this invention, example of databases described herein include "personal" databases and "local" databases.

One example of a designated content data file database 220 of the type illustrated in FIG. 9 is a "personal ties" type of designated content data file database. Such a "personal ties" type of designated content data file contains material either generated by the author and therefore innately of the closest proximity to the author or material that the author has otherwise selected as belonging to the set of personal content data files. For example such a database would indicate that an associated content data file contains personal photographs, movies, clippings from local newspapers of family exploits, works of personal art, documents and other recordings of personal or family achievement and all other content that meets the author's criteria.

Another example of a designated content data file database 220 of the type illustrated in FIG. 9 is a "local" database (not shown) contains the content data files whose content has mid-levels of significance for more general populations and thus would likely be of less than the greatest and immediate significance to the author, performers, characters in the narrative and the audience but would be of greater significance to author, performers, characters and audience than to the larger population. For example, images of the author's town would be of significance to the author, characters and those performers and individuals in the audience who come from the same area as the author, especially if they were there in the same time period Such a local database can be for individuals that are linked by proximity in time. People of the same age, even physically not collocated, are known to share a general perception of experience. There is, therefore utility in distinguishing between types of general significance. When general significance is a defined as the function (size of population)×(intensity)×(duration over time)=(overall significance) then it may be useful for some applications to distinguish between content data file content that effects large populations intensely for short periods of time (for example a disaster like a hurricane or an achievement like landing on the moon) and content data file content that effects large populations at low levels of intensity (for example the colors typically used in furnishings for a number of years or a breakfast cereal or similar product that was constantly advertised) as well as content that falls in-between (for example popular movies, songs and television programs). It is further understood that share characteristics such as being the same age and going through similar life stages will further aid in identifying what items of general significance of likely to be of particular significance to the author, performers, the audience and the characters in the work of communication.

Finally, it is worth repeating that it is understood that the functionality of these databases can be achieved within a general database(s) through the use of fields, views, metatags and other tools well known to those versed in the art of database design and who choice will be a left to the creator of the individual application.

FIG. 10 shows one embodiment of a product database 230 that defines a structure for a work of communication. Product database 230 at a minimum contains criteria 232 and fields 234 and 236 that contain the organizing structure for the relationships between content data file in the product as well as the status of the inclusion of various content data files in the product.

As is generally discussed above, a typical organizing principle for works of communication is an underlying narrative. The narrative defines a spatiotemporal collection of relationships between content data files and events that will be instantiated as a work of communication by the attachment of content from content data file. The terms used for these related content data files change with the art form to which the system is applied as well as the level at which the relationships occur. For example, a drama is composed of acts and scenes while music is composed of movements and passages. For that reason, the convention of art form neutral terms, such as, "narrative nodes", is used here. Each narrative node is a subset of content data files that is required for the narrative or optional depending on circumstance.

Product database 230 is therefore composed of product descriptor fields 234, one of which is a unique ID for the product 238, and a unique ID for each narrative node within the product 239, potentially associated with a time code or similar absolute measure that governs the relationship of nodes to the overall product as is currently typically done by conventional software applications used to edit presentations, videos, films and music.

Each node has links to either a content data file, or a repository of content data files or a null. Each link is in a required, optional or inactive state. For example, when the work of communication is a video image presentation system 20 displays to the audience the content data files that are required, but offers to the performer additional options in the form of selectable objects that can be displayed depending on the discretion of the author/performer. System 20 can be automated to display optional material in response to audience behavior (boos or applause) or author performer behavior (phrases, bodily responses, gestures, etc).

Each node has links to content data files, and those content data files can in turn have links to content data files. For example, the author/performer chooses an optional link and displays a scene typical of the Chicago lakefront in 1955. This produces an additional set of links that are required, optional, or inactive. System 20 therefore has the ability to "look ahead" of the narrative and sort for potential content data files of potential significance to the node, author, performers, characters in that node, and audience to some depth that will be a function of the particular application and hardware platform.

Product database 230 also has a criteria 232 and associated fields that, at a minimum, describe the time and location of the node within "real" spacetime. That is, the node will be described as being "Chicago, Spring, 1993-Fall 1994" or "New York, 1 am, Wed, November 11th" or a generic equivalent such as "small town, summers day."

Additionally, a node can have a descriptor criteria 232, and field 234 that indicates the role played by the node within the narrative. Potential roles of interest include but are not limited to context setting, surprise, drama or resolution. Such a descriptor field 234 enables system 20 to sort for content data files on an aesthetic basis useful for maintaining interest. Context setting content data files can be described by the formula as having wide general exposure coupled with a low level of significance but of lengthy temporal duration. A dramatic content data file can rely on high levels of significance and short temporal duration and close proximity, that is, a close relationship to the associated person(s).

Product database 230 can also have criteria 232 and associate fields 234 like those in the content data file database 210 that describe a node in terms of preferred characteristics of resolution, appearance, and media type that will allow system 20 to rapidly generate a work of communication in response to changing goals of the author, performers and responses of the audience.

Additionally, product database 230 can have criteria 232 and associated fields containing overall rules governing the presentation, editing, and assemblage of the content data files that will constitute the work of communication.

FIG. 11 illustrates one embodiment of a link database 240. Link database 240 performs the function holding the results of a sort based upon content data files. The link database addresses a need to take the narrative node characteristics in the product database 230 and apply them as search criteria against the content data file databases, such that the resulting linkages placed in the linkage database 240 are optimized for significance and contextual relevance.

In FIG. 8, an embodiment of object database 210 is shown having a criteria 212 and files 214 for a content data file gauging its general significance. In addition to general significance, there the relative significance of the content data file to a story can also be determined. A metaphor for describing this relationship is the law of perspective. General significance can be said to figuratively measure whether the content of a content data file is a mountain or a molehill. While relative significance can be said to figuratively gauge whether a molehill is close enough to the work of communication, and a person associated with the work of communication such as the author, the characters within the work of communication, performers and the audience to be seen as significant as a distant mountain.

By having a description of the node in the narrative, content data files can first be classified by general significance to a given node and narrative type and for appropriateness to the narrative node and narrative type. By having a description of the author, additional classification can then take place as likely significance to the author is approximated. Further, when information about the audience is available, system 70 can further attempt to classify select content data files on the basis of information about the audience. Finally, system 20 can respond in a dynamic manner to changes in the work of communication, the author, performers, the characters within the work of communication and the audience, essentially allowing a performer and other performers and audience to "jam" using multi-content data files.

Figure 12:
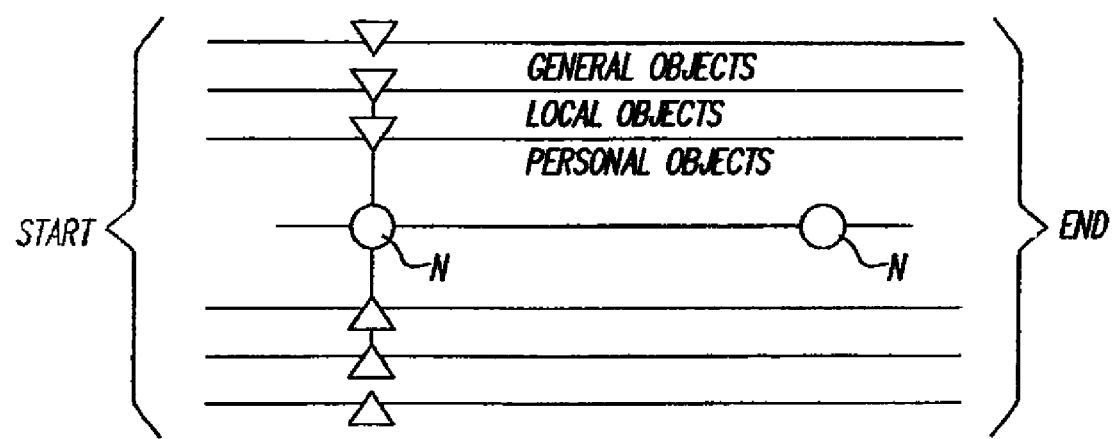
FIG. 12 shows a schematic figure illustrating the relationship between the content data files and an associated person.

FIG. 12 shows a schematic illustrating the relationship between content data files and an associated person or group. The principle this simple graphic illustrates is that current systems of content data files management treat all content data files as essentially equal, in comparison, using the concept of relative significance, content data files can be organized in a manner congruent with how individuals actually perceive the world, that is an a manner congruent with the principle of personal perspective.

Figure 13:
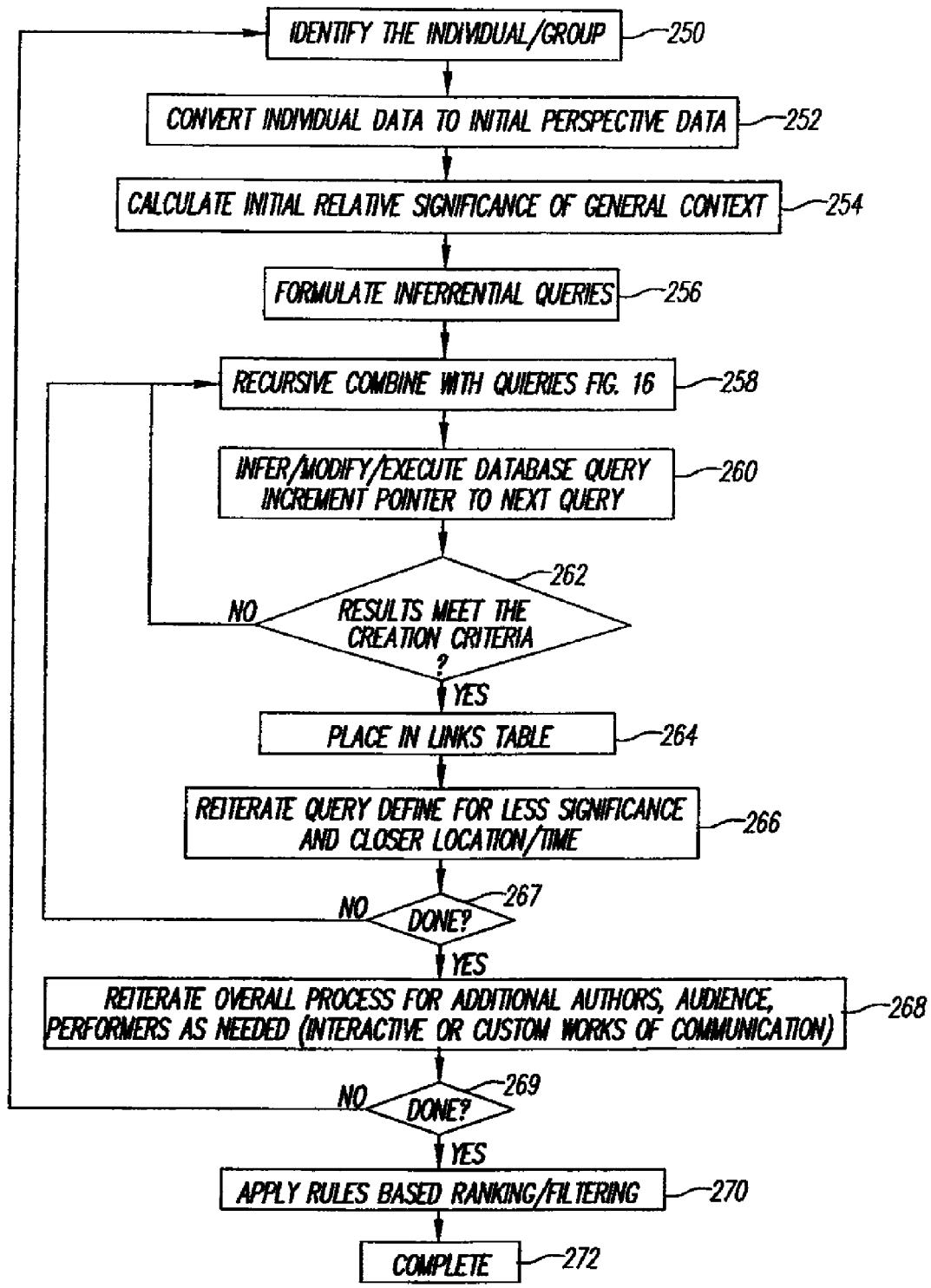
FIG. 13 shows a flowchart illustrating the association of the relationships between content data files and an associated person.

FIG. 13 shows a flowchart revealing how the relationship between the content data files and an associated person can be used to create linkages for use in the linkage database 240. As previously observed, the associated person can comprise an individual or group and may be the author, characters, performers or the audience, with the roles of author, performer and audience being dynamic and changeable and potentially simultaneous.

In a first step of the method, an associated person is identified (step 250) (one or more audience, performers and author) and a knowledge base 200 is obtained for the associated person. Data from the knowledge base 200 is converted to guidelines (time, location) useful for providing an absolute point of reference from which to measure the degrees of separation of CDFs (step 252). Step 254 then builds upon step 252 and the formula for degrees of separation and the absolute significance of the CDFs as criteria for classification of content data files such as personal, local and general classifications (step 254) by calculating the relative significance.

An inference query (step 256) is then created using inductive and deductive logic and the principle of virtual perspective as described generally above and as described more specifically in FIG. 4. In this embodiment, however, the process of developing an inference query is a two part process that involves developing an inference query that searches for general items of broadest and highest relative significance to an individual or group (the author(s), character(s), performer(s) and audience) again as described above (step 256) and a step (step 258) that combines such an inference query with a similar supplemental inference query that is determined by similar calculations for calculating relative significance of content data files to the nodes of the narrative line. In particular, in this embodiment, the inference queries that search for general items of broadest and highest relevant significance to an individual or group are combined reiteratively and recursively with the supplemental inference queries that are produced by similar calculations for calculating the relative significance of content data files to the nodes (discussed in detail below) of the narrative to create combined inference queries.

The combined inference queries generated in 258 are then used to return results (step 260) that are of contextual significance to both the author and node of the story. For example a combined inference query could take the form of combining a query for the individual of what books were of read by the individual with a node (discussed in detail below) query limiting the individual query to the time shortly preceding and following the time of the node. The reiteration can come when the information about the books is used to suggest additional inferential queries concerning the locations and characters in the books that may be associated with the events in the narrative.

In results from step 260 are then tested against the product creation criteria (such as setting a boundary for the minimum level of relative significance, types of CDF media to be searched and other constraints).

If the test is failed, then the system can go back to step 258 and reformulate the query to produce more satisfactory results. If the test is passed then the results (the returned location of an acceptable CDF) are entered into the link database (step 264) for the potential product.

The process is reiterated (step 266) for inference queries that are formulated for increasingly less absolute significance and fewer degrees of separations (that is closer in physical location and time as well as other dimensions.)

Decision step 267 determines if the query is to be reiterated with new values moving from the general (many degrees of separation) to the personal (no degrees of separation).

Step 268 identifies when the process is complete for an individual or group and the nodes of the narrative line, requiring storage of the CDFs and links to the CDFs in a manner useful to the product database.

Decision step 269 determines if additional reiterations are required for additional individuals or groups.

Step 270 applies rules useful for ranking the results returned by all the previous iterations for appropriateness to the products selected by the author. For example the rules may prefer that CDFs of the highest relative significance are to be retained and the rest discarded.

Step 272 is completion of the CDF acquisition portion of process.

Note that this figure assumes that absolute significance has already been calculated.

It will be appreciated that in certain embodiments knowledge base 200 contains fields that allow association of the associated person with a particular location at a particular time. Similar fields in the content data file database 210, the designated content data file database 220 and the product database 230 allow the first level of associations to be created in conjunction with the absolute significance value calculated for a content data file. On this basis, content data files whose content is of greatest absolute significance and ubiquity to the author, performers, characters and audience can be selected (major historical events, figures in popular culture, ubiquitous products).

A relative significance can be calculated for a content data file where the lower absolute significance value due to the decrease in absolute population is compensated for by the concentrated impact or ubiquity of an event or object for a smaller area due to the principle of proximity resulting in increased relative significance. That is, the relative significance of events or objects depicted in a content data file comes not only from the absolute calculation population size×significance×duration but also from the significance as a variable composed of intensity and proximity. Through this principle, what occurs to a smaller population may have greater overall relative significance because proximity multiplies the intensity of the experience. This principle is a restatement of the observation made earlier that what happens to us personally, although a molehill in the eyes of the world, may be seen as having greater significance for us than a mountain collapsing in a remote part of the world, In this manner, the linkage table is populated not only with content data files of global level significance but content data files whose content is not of the greatest significance globally but of high significance locally: content data files in the form of formative, nostalgic or otherwise significant and memorable events and objects for that generation in that place.

For example, for the just described group such as an audience drawn from Chicago whose average age is 60 in 2005, recent global and local content data files can be selected going back 60 years, with the understanding the likelihood that the local objects will decrease in likelihood of significance as the number of individuals in the audience from the region decreases going backward in time due to having moved to or away form Chicago.

Using an individual and author as an example, the same technique would be used but with the added benefit that the location versus time coordinates of the individual would be known with certainty at all points thus eliminating the statistical decline of relevance that results in working with an average population. In addition, the knowledge base 200 could be used to provide content data files that have been pre-selected for known high significance for that individual.

The preceding paragraphs also describe an important principle. The principle of degrees of separation is well known as the principle that everyone is separated from everyone else in the world by no more than six degrees of separation. Although far from a law, there is enough truth in the observation to make it useful as a means of gauging both the relative significance of an event or object (it happened to you, it happened to someone close to you (traversal of the genealogical associations of the individuals), it happened to someone you know, it did not happen to anyone you know) but also for finding content data files that are likely to be of high relevance and recollective value for both the author, performers and audience and pertinent to enabling suggesting the nature and background of the characters in the work of communication.

The preceding also suggests the reiterative capability of the system. The system uses information about the author to identify other characters who participated in a real event that is a node in the author's work of communication. For instance it may be know that the author was in college during certain years, and there are photos that indicate the author was in a particular college. The system can then search for content data files of other students in that college at the same time and identify photos taken by others that contain an image of the author. The profiles of those photographers can then be linked into the list of associations for this author and narrative and in turn lead to other characters and content data files that will suggest further connections and relationships. This, in turn, can be useful to uncovering content data files of direct significance to the narrative and content data files useful in suggesting the nature of characters within the narrative. By way of illustration, system 20 could uncover that one friend of the author's from college was from California and a surfer while another member of the author's college athletic team was from North Carolina and raced cars).

It should again be underlined that system 20 is not only scalable, but self-optimizing as it scales. System 20 has the ability to begin with a limited amount of information about the author and characters and then use this information to create further searches and inferences that in turn enable it to learn more about the author and individuals which in turn enhance its ability to phrase searches. This ability is only enhanced as more individuals use system 20 and contribute their stories and attendant linkages.

Figure 14:
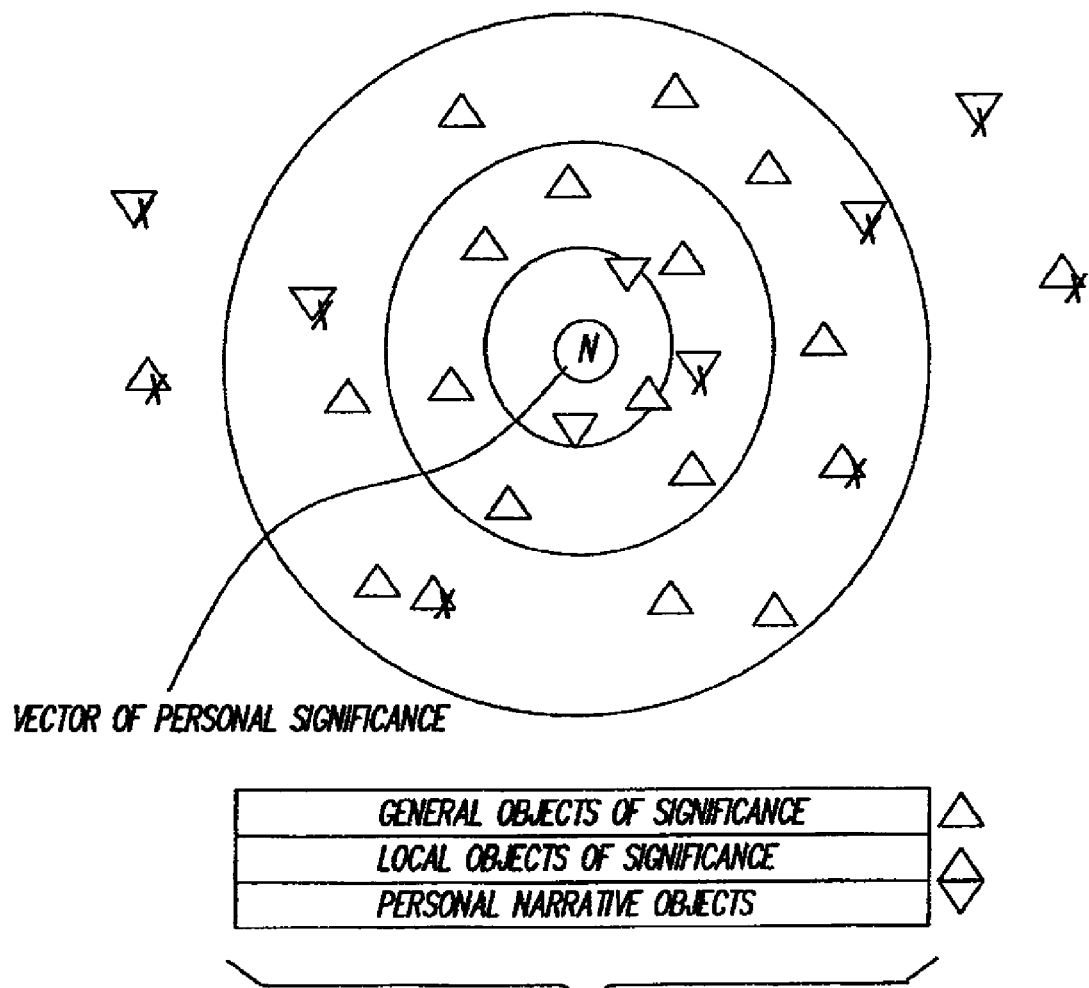
FIG. 14 shows a schematic figure illustrating the relationship between the content data files and nodes in the narrative.

FIG. 14 shows a schematic illustrating the relationship between the content data files and nodes of the narrative.

For example, a personal database could hypothetically include content data files related to going to college at the Illinois Institute of Technology in Chicago. The system notices that there are fewer degrees of separation between this personal content and the audience thus improving the likelihood that these content data files will be of higher mutual relative significance than content data files of the same absolute significance but of greater separation.

By identifying content data files of mutual high relative significance, additional tools for enhancing a narrative are made available. Shared experiences aid in recollection, enhance engagement through recognition and provide a solid contextual footing. By identifying which content data files are superior for aiding context and are familiar, the opposite is made available; that is system 20 is able to estimate which content data files will be unfamiliar or surprising. The proper combinations of content data files that are alternately engaging or surprising are a useful technique in enhancing the entertainment and evocative quality of a work of communication.

Figure 15:
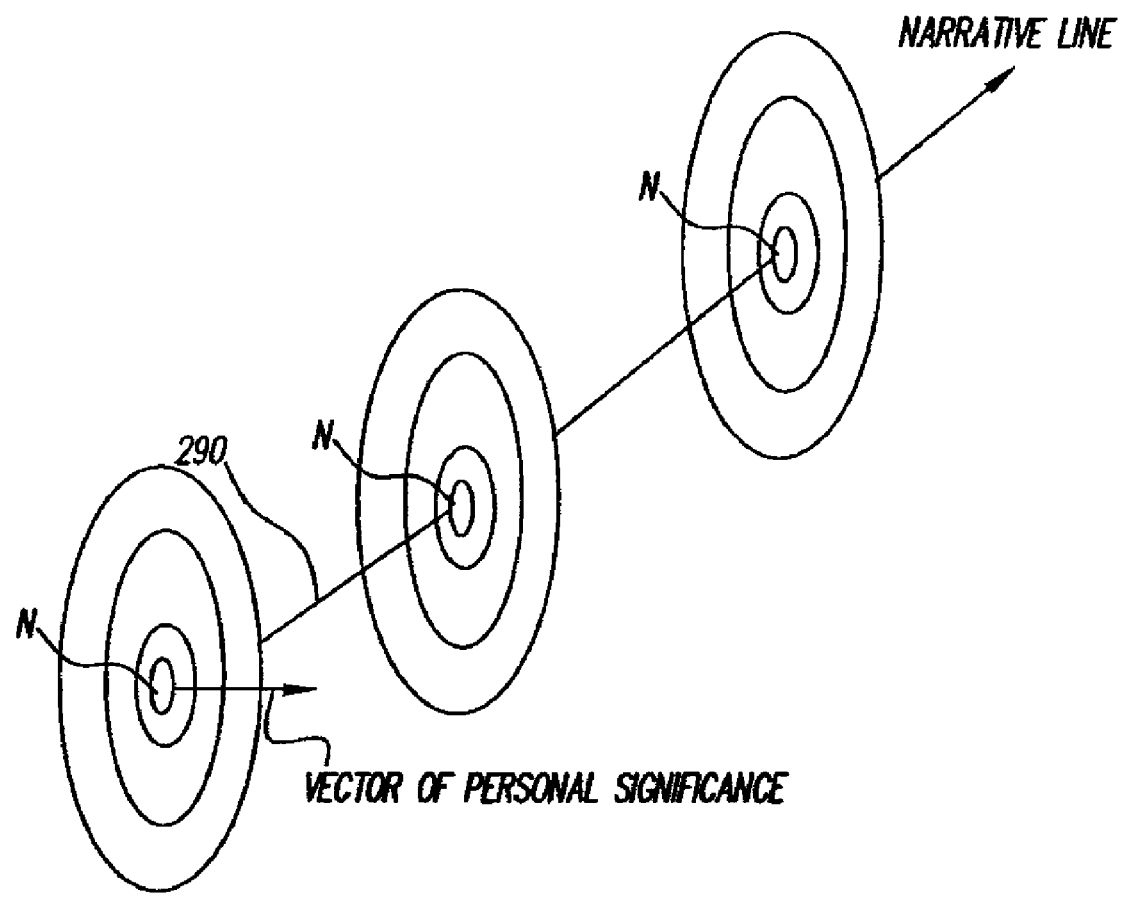
FIG. 15 shows a schematic figure that illustrates the concept of vectors of personal significance and a narrative line.

FIG. 15 shows a schematic illustrating a multiplicity of nodes N arranged along a narrative line 290. Although the nodes N are shown arranged on a straight narrative line for simplicity of explanation, the nodes may occupy any position relative to each other in a multidimensional, media object space.

Figure 16:
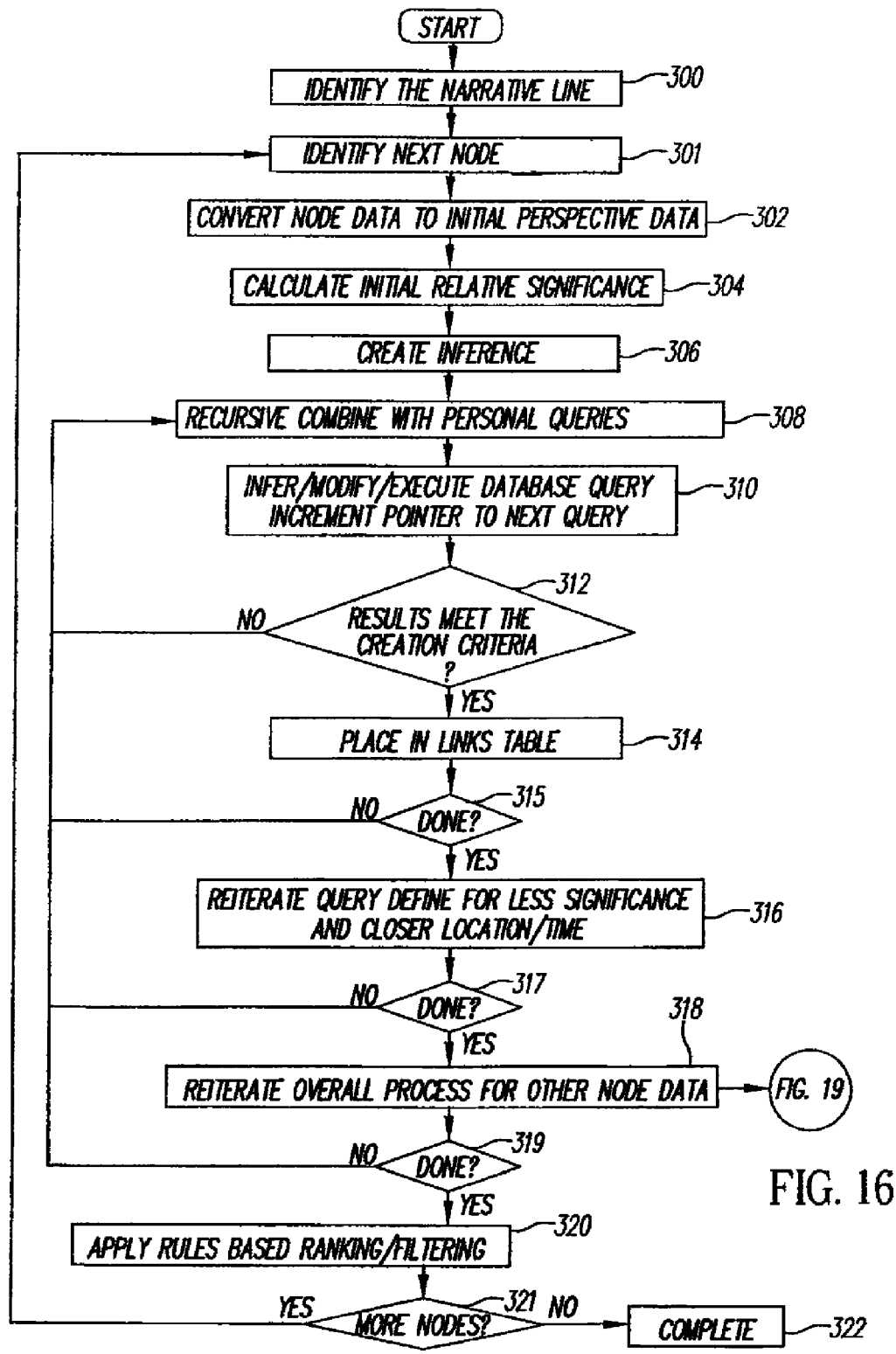
FIG. 16 shows a flowchart illustrating the relationship between content data files and node of the narrative.

FIG. 16 shows a flowchart illustrating a method for examining the relationship between the content data files and "nodes" of the narrative to create additional inferential queries. As previously explained, one or more nodes are defined for a narrative by author 72 or based upon automatic analysis of the content supplied in the content data file to sufficient detail to allow calculation of using the relative perspective formula previously described.

In a first step of the method a narrative line (sequential arrangement of narrative nodes comprising a backbone for a potential product) and supporting content data files are identified (step 300) and a product data base 210 is obtained for the narrative line. Data from the product database 210 is converted to guidelines (time, location) useful for providing an absolute point of reference from which to measure the degrees of separation of the designated content data files (step 302). Step 304 then builds upon step 252 and the formula for degrees of separation and the absolute significance of designated content data files as criteria for classification of content data files such as personal, local and general classifications (step 304) by calculating the relative significance to the node.

An inference query (step 306) is then created using inductive and deductive logic and the principle of virtual perspective as described generally above. Initially the step begins with searches for general items of broadest and highest relative significance.

In step 308, the similar queries produced by similar calculations for calculating the relative significance of the supporting CDFs to the individuals associated with the story (FIG. 13) are combined reiteratively and recursively to create inferential queries.

The additional inference queries generated in 308 are then used to return results (step 310) that are of contextual significance to both the author and node of the story.

Results from step 310 are then tested against the product creation criteria (such as setting a boundary for the minimum level of relative significance, types of content data files to be searched and other constraints) (step 312). If the test is failed then the system can go back to step 308 and reformulate the query to produce more satisfactory results. If the test is passed then the results (the returned location of an acceptable CDF)

are entered into the link database (step 314) for the potential product. Steps 308-314 are then repeated as necessary (step 315).

The process is reiterated (step 316) for inference queries that are formulated for nodes useful for providing alternative narrative paths that may be available in interactive and customized versions of this disclosure and repeated.

When all required reiterations are complete (step 319) the overall results are filtered a final time on the basis of rules governing the ranking of the results returned from the multiple iterations of the inferential queries (step 320). For example, the rules may favor retention of the context data files of highest relative value across all the nodes or for a limited selection of nodes in a particular range (data files of local significance.) If more nodes are present (step 3210 the process can then return to step 308. If there are no more nodes, the process is complete (step 322).

Figure 17:
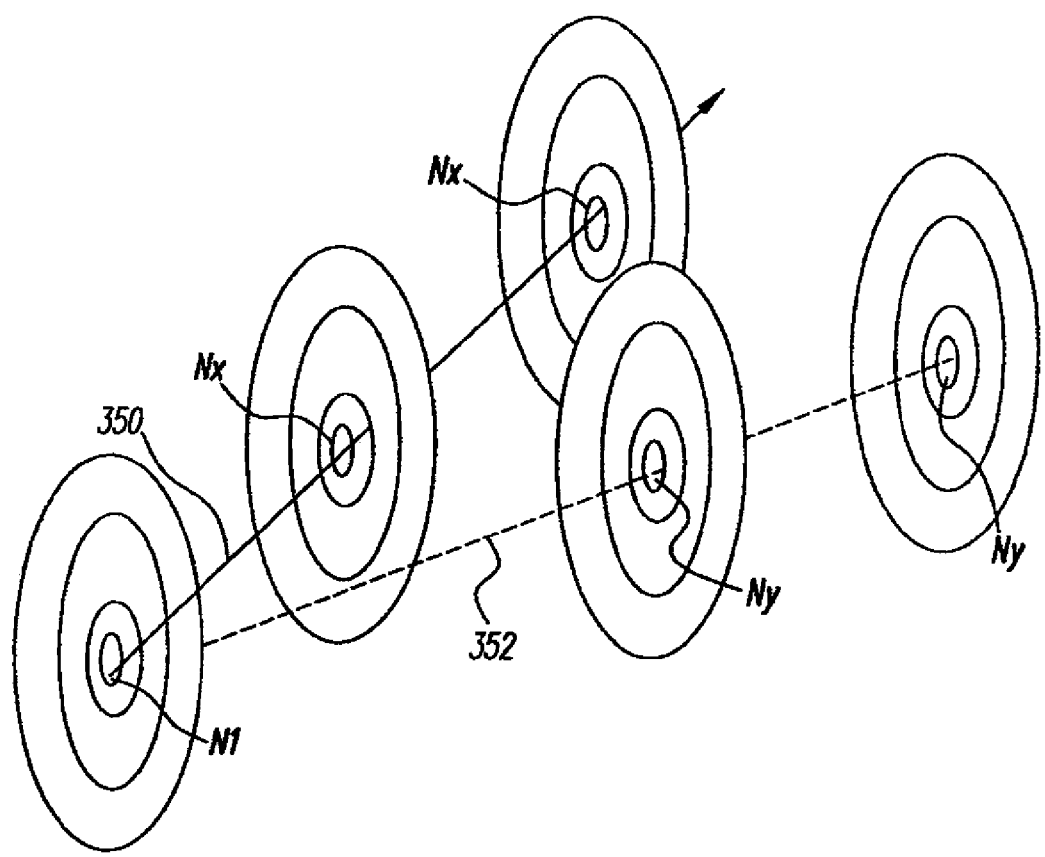
FIG. 17 shows a flowchart illustrating a method in accordance with the present invention of compiling a work of personal communication, which has a narrative form.

FIG. 17 illustrates that the author of the work of communication may choose to offer the option of making choices when interacting with the work of communication. In addition to a first narrative line 350, having nodes Nx, an additional narrative line 352 is provided having additional nodes Ny that allow a choice of an alternative narrative line 352 at the time of the presentation or performance.

For example, a node in a narrative may allow a choice to proceed with one or more alternative narrative lines. If the narrative is about a trip to Hawaii, there is no reason to constrain this system to only one narrative line from start to finish. The narrative line may be redirected to any alternative node as allowed by the work of communication.

Figure 18:
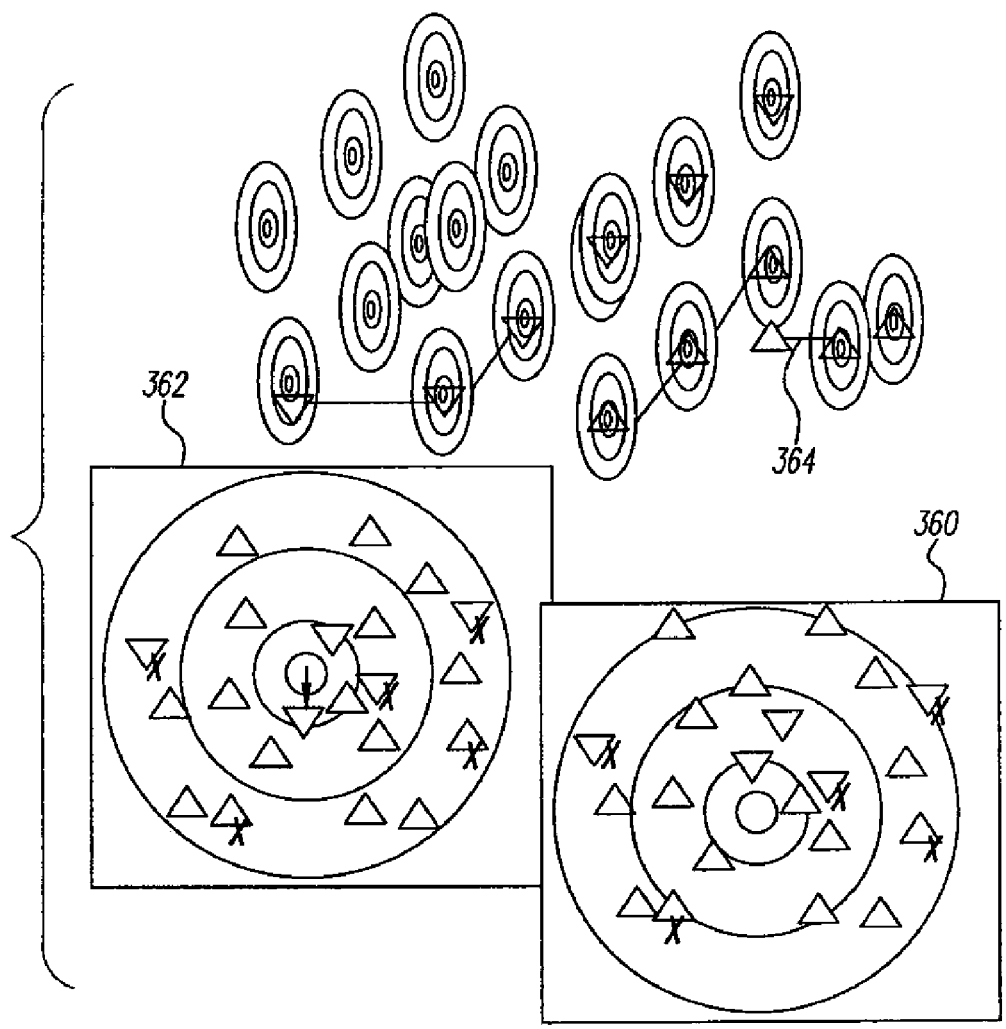
FIG. 18 shows a flowchart illustrating a method in accordance with the present invention for enhancing the editing and creation process of a work of communication with context data files.

FIG. 18 illustrates how the system has the ability to recalculate the virtual perspective 360 with the result that a context data file can be recast as a node, the contextual calculations reiterated for the new node definition and a new narrative 364 established.

In bottom portions 360 and 362 of FIG. 18 are shown the base case 360 and 362 where objects have been associated on the basis of relative significance to a node. In 362, a file has been selected as a narrative node element and the boundary conditions for determining which of the content data files should be used for a context data file can be recalculated. This allows the author to define a broad knowledge base 364 that can be interactively navigated at the time of performance or presentation. The new nodes can in turn be used to generate new narrative lines 362 or provide contextual objects that will generate new nodes 350 as illustrated in the figure at the top of the page.

For example, the audience shows high interest in a CDF in an interactive presentation. The presenter selects that CDF, which causes the system to both recast the product displayed to the audience and to fetch an alternate set of nodes that allow illustration of an alternate narrative line.

Figure 19:
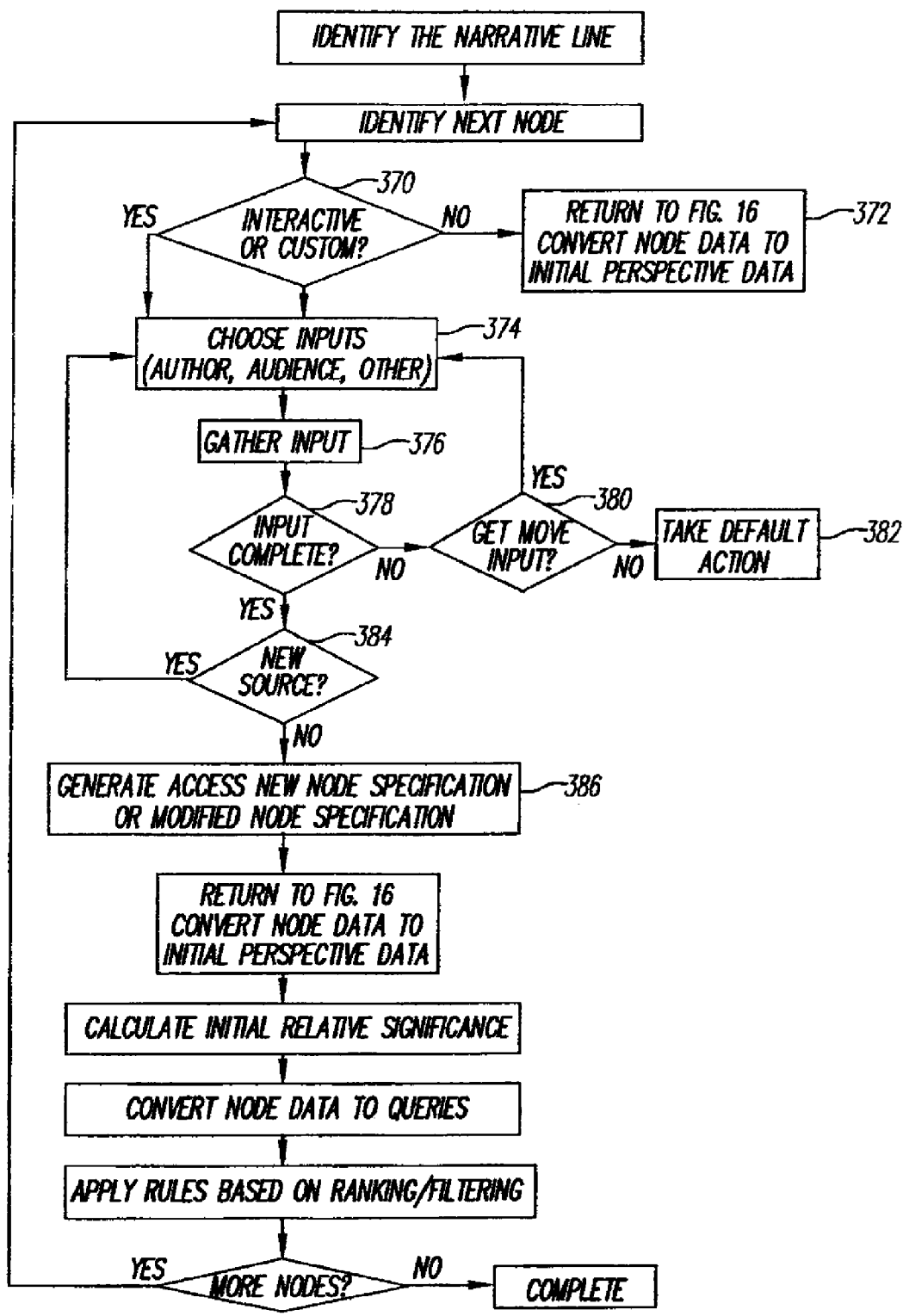
FIG. 19 shows a flowchart illustrating a method for determining inference queries and using such inference queries.

FIG. 19 shows in detail the method of identifying the next node 301 that appears in FIG. 16. Decision step 370 chooses a path based on whether the work of communication is chosen to be interactive or customized. If not interactive or customized, then step 372 returns the process to the departure point, step 318, in FIG. 16. If customized, then the inputs for interaction and customization need to be selected, step 374. For example, the author previously selects for this product definition that the audience or some combination of the presenter and audience as the source of input to the process of selecting the next node in the presentation.

Step 376 then gathers the selected input, for example, monitoring microphones and cameras to capture audience response. Decision step 378 requires that the system apply rules to determine if sufficient information has been gathered to execute the next step. If not, the system executes decision step 380 to determine if gathering information should be continued or terminated. For example, if no information is received or conflicting information is received and the rule states that a decision to continue will be made within one minute of the start of gathering input is violated, then the system has a basis to give up on gathering input and will make a decision based on other criteria.

For example, if no information is received (or conflicting information is received) for longer than a minute, if the rule is that a decision must be reached in a minute or less, then system 20 may choose to "give up" on gathering input and exercise an alternate means of coming to a decision.

If decision step 380 is positive it returns to step 376. If not, it continues to step 382 where a default action is taken. Typical appropriate actions are continuing to an author selected next node or applying new criteria to the input that has been gathered. Decision step 384 provides the option of gathering multiple inputs for the selection of the next node by allowing a return to step 374.

When sufficient inputs from all sources have been gathered, the system continues to step 386, the selection of a new next node for the presentation. Following this step, the process continues as previously described in FIG. 16, step 301.

In explanation, in a work of communication where each node is in a fixed relationship upon presentation or performances, the process of identifying what is the next node can be the result of querying an existing d list of nodes, stored recoding of the nodes in a fixed sequence, reading a printed record or some equivalent activity.

In the case of an interactive work, the next node may result from some input coming from the audience, performer or author provided at the time of the presentation or performance. The system may be designed to input multiple individuals serially or simultaneously and may choose to input from one, some or all the roles mentioned.

Inputs for the audience can be intentional such as auditory cues (applause, shouts, stamping feet), a combination of auditory and location cues (one part of the audience making more noise than another), actions (making gestures, holding up markers) or any activity that can be readily detected by cameras, microphones and sensors such as position, pressure and weight sensors.

Inputs from the audience can also be unintentional, such as body temperature, gaze detection and head tracking, pupilometrics, pulse rate measurement and similar forms of measurement of involuntary physical response to stimuli. Similar inputs of voluntary and involuntary response can be used to allow the performer(s) or author(s) to modify the choice for the next node to be presented or performed.

Upon choosing to input, the system gathers input information until it is able to satisfy the criteria for making a decision on what node to go to next. The information gathering step will routinely be limited by some function such as time (if not information come in during a preset time then the system goes to a default activity), magnitude (if not enough applause is detected to meet a threshold value the system may choose to ignore the input), clarity (if two conflicting inputs are equally matched precluding a clear choice of a next node) and so on.

Note that a default action can be anything—get a default node, have the system make a rules based recommendation for the next node, stop the process, prompt the author/performer to choose are all options easily accomplished by one skilled in the art of systems design.

Once the input is complete a choice is made unless the system is polling multiple inputs. In addition, the information from multiple inputs, including system generated recommendations, can be mixed to choose a node or mix existing nodes to create a node that did not previously exist.

The final component of the method of the invention is provided by using the nodes in the narrative captured in the product table illustrated in FIG. 6. The narrative nodes function as keys for the selection of content data files useful in enhancing the work of communication defined by the narrative contained in the table. However, unlike past systems where a search of all possible sources of content data files would return potentially vast numbers of results that then have to be manually sorted, (or return no results or results that inappropriate for other reasons) the current invention has pre-selected content data files on the basis of their significance to the author, performers, characters and audience. For example, the narrative node may use a keyword, key image, or key sound for fish. Rather than force the author to search all databases for an appropriate fish, the system by knowing the time location of the author, performers, audience and narrative node and characters within the narrative node; could anticipate the author's choice per rules provided by the builders of a specific instance of the system, those rules allowing a range of interaction styles from fully automatic, to assistive, to completely manual). Thus knowing the narrative node is set in Japan, the system could put content data files with content of Japanese koi at the top of the list.

In addition, the system can suggest related content data files whose association with the content specified by the narrative node and its characters can be a stimulus to recollection and engagement of the author, performers and audience. For example, knowing the location and time of the narrative node, the author and the audience allows the system to suggest pictures of koi pools, art images, streets in Japanese cities where the action is taking place.

It is again emphasized that the system has the power to recursively optimize. A personal photograph chosen by the author can be analyzed by the system using additional knowledge about the author (the author was in a particular college and individuals in the photo are wearing team uniforms, therefore the system may test an inference that the figures in the photo are college team members and initiate a search photos of such team members which it can then use to identify the individuals in the author's photo).

Further, the system can be governed by rules to automatically provide set ratios of context data files and content data files to function in the foreground of the work of communication. For example, In further addition, the system can now take content data files a database of content data files using the content data file database 210 or 220 as described in FIG. 8 and in conjunction with the data in the knowledge base personal table FIG. 7 and product table FIG. 10, alter them with the intent of optimizing their significance. For example the narrative node specifies a red automobile. From author data in FIG. 7, the system offers the author 1955 blue Buicks. However, searching the general database of FIG. 7 only yields a red 1955 Buick. The system can be provided with rules to alter content data files from the general database to match content descriptions in the personal database and provide the missing media object content.

This principle applies to all combination of content data files from knowledge base 200 described in FIG. 7, the general database of FIG. 8 and the product table FIG. 10. The author can choose to implement rules that allow content data files from one set to be altered to better content data files described by but missing from another database. For example, instead of altering the 55 Buick to be blue, the system may be directed to match an audience preference for Ford automobiles. Alternatively, the rules may give precedence to the narrative node in the product table FIG. 10 and may alter media any content data files to place an image of the author behind the wheel of a black 2005 Ferrari.

Since the system is enabled to identify missing content data files that would be of potential significance, the tool is created to generate content data files as needed to fulfill the need. For example, although no images exist of Chartres Cathedral on the specified date, with adequate information the system can extrapolate weather and so lighting conditions and construct an imaginary but significant to the author and audience media object to meet the requirements of the narrative node and its characters and any performers that may also be required.

Additionally, the content data files in question will be modified per the rules in the FIG. 10 product table to meet the stylistic requirements of the author. For example, since context data files can be identified as such, a stylistic modification to make them less detailed ("cartooning") and thus more universally engaging can be applied.

The first step is to determine a narrative focus. For example the focus of the narrative may be a vacation in Paris. The author then determines mode of expression, the nodes of the narrative and the additional characters if any. At this point, system 20 may be invoked by providing a topic, a location and time period and duration as well as a classification (personal, general, local or ubiquitous) that will cause content data files to be displayed for the purposes of enhancing the memory and imagination of the author (or an author, performers and audience if the purpose of the work of communication is to provide a performance). The author may then select from the content data files presented and place them in a narrative relation to one another, thus establishing the nodes that define the underlying narrative.

The nodes may be content data files or narratives containing other content data files or other narratives. For example, the narrative "Paris vacation" may contain a media object representing the Eiffel Tower or a node that is a narrative composed of multiple content data files that communicate a sequence of events, objects, settings and characters relating to the Eiffel Tower. Once the author chooses a core set of nodes, the author can arrange those nodes in a sequence as is typical of programs useful in creating presentations. The sequence may be in simple chronological order, spatial order, in an order related to the history of the location rather than the author or any other schema deemed fit by the author.

In addition, the author will be asked to choose the output for the narrative, since the system will have to use different selection criteria and assemblage principles depending on whether the output will be print, human interactive performance, computer interactive performance, film, video, audio or any form currently in use or to be in use in the future. Note that this is unlike the previously stated programs designed for the creation of a work of communication since those programs typically are designed to assist in the creation of product for a specific media; for example a publishing program such as Quark Express will be used to create a print product while Adobe Premier might be used to create a video, Macromedia Director to create an interactive computer product, Soundforge to create an audio product and so forth. That is because those systems rely upon the author to input specific information about presentation of the media.

Because various methods described herein are designed to understand the relation of the content data files to the author, characters, performers and audience, system 20 is able to extrapolate principles of assemblage from the underlying relationships of the content data files to the narrative, characters in the narrative, author, performers, audience and to other areas that may be germane to the work of communication that is the product (the place where the product will be presented, the specific equipment for transmitting or executing the product, and all other environmental aspects that come in contact with the work of communication that is a product of the invention. For the reason just given, the author may then be prompted to choose tools appropriate to the type of output selected and to choose the level of automation for such tools, the levels ranging from completely manual to completely automatic. By tools are meant hardware and software useful in assembling a work of communication typically in the form of templates, editing, converting, assembling, correction software and hardware that will translate author intent into actions such as scanning, altering, and creating media.

Upon choosing an output format or formats, the system will then be able to analyze the narrative and extrapolate selection criteria. In addition, depending upon the level of automation desired or premised into the design of the system, the system will be able to recommend additional content data files or narratives because it has a structure that allows it to anticipate what content data files will be of what sort of significance to the narrative, author, performers and audience.

For example, upon placing the narrative nodes in a basic sequence, the author may have left certain nodes unfilled except for a description. The system, knowing the date and location, can interpret a simple description ("street mime") and search for a media object that fits the author's stated criteria. In other cases, if the implementer so enables the system, the system (by knowing the author, characters, and performers and audience) and the arc of the narrative and the form of output, may have recourse to the compositional rules for that medium to suggest additional nodes for the narrative, and so not only learn from the author but also function as a teaching aid to the author. For example, the system can determine that too many adjacent nodes have to do with art museums, and may suggest nodes relating to restaurants and historic sites to maintain audience interest; especially if the system has a profile that indicates the audience is spends more money on food than on art. The system may additionally suggest a character to be used to provide a focus for audience identification; therefore enhancing the narrative by adding such a character as appropriate.

Additionally the system may record the behavior of professional storytellers in assembling a work of communication and use the learning from one author as a form of teaching and hinting to another.

Alternatively, the author may choose to be stimulated and choose to have the system respond in a way that deviates from the author's expectation by some relative degree, The author could therefore choose to have the system assemble the content data files; per some other author's database, from the database of a character in the work of communication, exclusively focus on the audience database, or specify some degree of randomization to introduce an element of stimulating surprise.

The author may also choose to have the system recommend a narrative where the system does not limit itself to only those nodes provided by the author, but the system recommends a sequence to the narrative nodes that includes nodes the author did not provide. For example, the system may be allowed to search for associations and patterns (in the inferential manner previously described) typical of good narratives and may recommend (and be allowed to provide drafts) to the author that particular images of a special life event (like a graduation) are typical and iconic (being handed a diploma) and therefore preferred for context setting or that images are well supported by CDFs and will therefore be preferred.

It should be made clear that the system's efforts to anticipate products that will be of value to the author relies on searching for patterns and associations in the context defining databases of this system in ways either typical of rules based pattern matching (where the system reverts to a default) or to ways familiar to those versed in the art of dynamic, reiterative pattern classification, such as use of a neural networks. That is, the system is search technology agnostic. This also includes means familiar to those versed in the art of constructing systems which observe behavioral histories and extrapolate behavioral preferences. In this case the preferred behaviors recorded will be the manner in which the author(s) (and performer, character and audience) have previously constructed works of communication. For example the system may be aware that the author prefers movies by George Lucas, and infers that the author may prefer a narrative that has a heroic structure (per Lucas's narrative stimuli from Joseph Campbell) as well as the narrative implied in the author's initial selection of nodes.

The system may request of the author a cost limit or other final output related information (is the output to be for personal or commercial use, how many people are like to see the product, where is the product likely to shared, is the product to be considered proprietary intellectual property or an heirloom that is to free to a family or private circle and other questions typical of creating a work of communication).

Upon completing all the input choices, the system will present the selected content data files in one or more sample layouts appropriate to the request of the author in manner that allows the author to easily choose between the primary offering of content data files and the additional or backup selections. For example, the author may not agree with the first choice proposed by the system or a media object for the Eiffel tower, but by selecting that object intentionally or through involuntary response, the system can offer alternatives (go through a slide show of alternative content data files to fit the selection criteria, providing a map of thumbnails, or some other means well known to those versed in the art of computer human interface design.

Additionally the author may choose to allow the system to select a range of objects that meet the criteria provided by the author, and then allow the work of communication to present the range of alternatives or change the manner in which the alternatives are displayed. For example, the final version of the work of communication may have images on the page constantly cycling through a range of content data files that traverse between the author's preference, objects that suggest a characters nature, performer preferences and the audience preferences while still meeting the needs of the narrative Using the techniques described above, it is possible, using system 20, to seek out content data files of significance to the author. For example, other parties (such as other characters in the work of communication) may have taken images at the same time the author was visiting the Eiffel tower. Knowing the time, date, narrative needs, and the appearance of the author and the time and date of capture of the other images, the system could offer the other parties them to purchase with the potential that or license those images in which the author or author's party actually appears in the images taken by others or to trades rights for images belonging to the author in which the other parties appear that images superior to those in possession by the author might be substituted for the authors.

After editing the objects, the author may choose to use other tools suited to other aspects of the work of communication (audio addition tools to an image track or conversely image addition tools to an audio track or tools to add interactivity as a few examples of a non-exhaustive list of such tools).

If the work of communication is not a work of live performance, the author may then have the system produce a draft (sometimes known as a proof, rush or rehearsal) of the work of communication.

If the draft narrative is deemed adequate by the author, then a final version of the narrative outline of communication can be produced.

FIG. 19 shows a flowchart illustrating the method in accordance with the present invention for an author to enhance the creation of an individual node page in work of communication (in this case the product chosen is assumed to be a personal photo album) with context data files.

Once the narrative has been created and the questions relating to the nature of the output answered, the author chooses nodes for the narrative (in this example, one such node being a photo of the Eiffel tower) and the system offers up context data files based upon each node.

Figure 20:
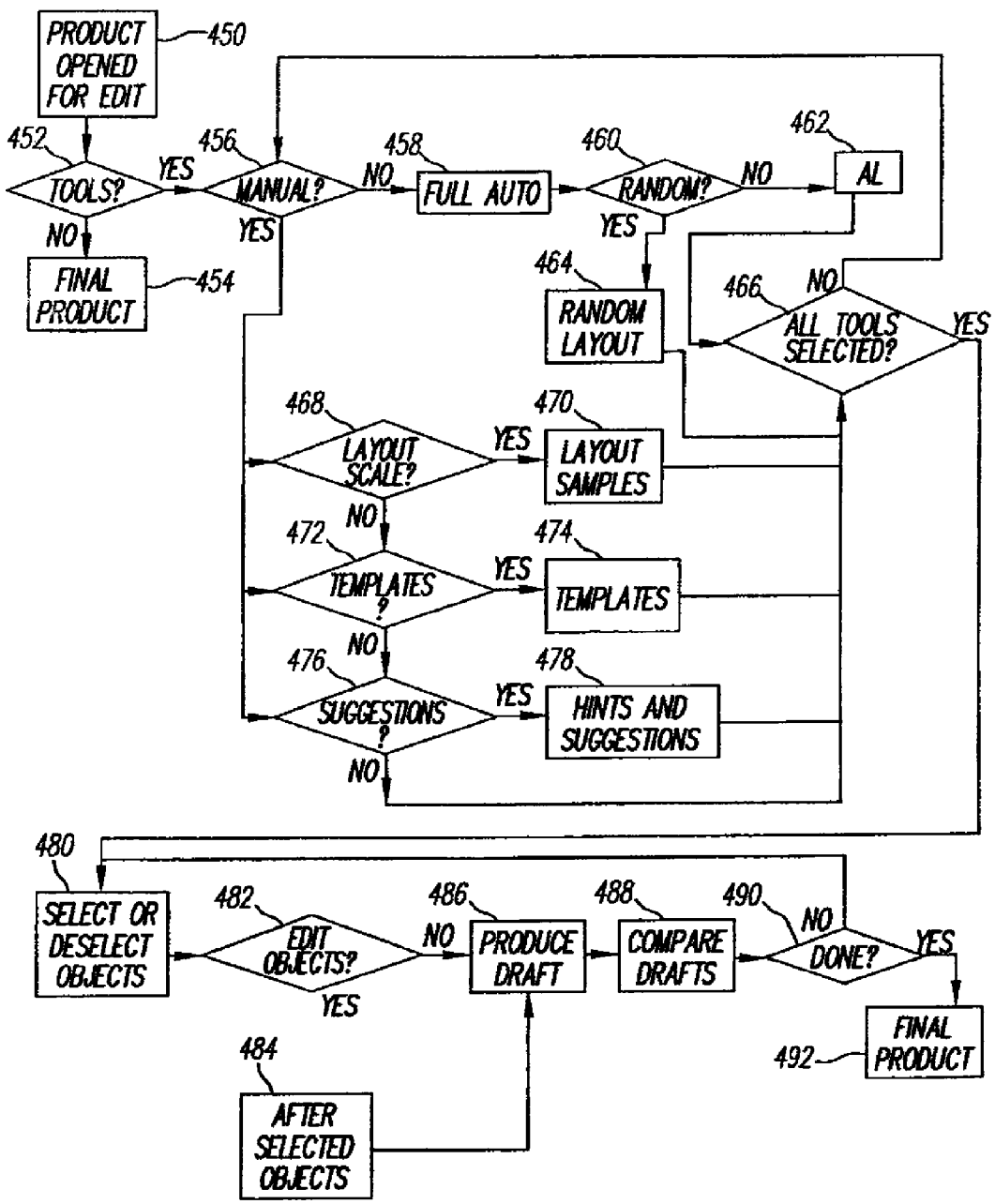
FIG. 20 shows a flowchart depicting one embodiment of a method for generating the work of communication.

FIG. 20 begins at the point where the author has provided personal content and has explicitly define or allowed the system to infer from the provided contact the nodes of the narrative line. The system therefore was able to construct queries that returned content data files useful for setting a context for the node.

Step 450 of FIG. 20 requires that an author who has logged on (and is therefore known to the system) select a product, for example a photo album.

Decision step 452 requests that the author choose to work with production tools appropriate to this disclosure, or accept a final product (step 454) composed of either the raw results from the inferential queries or a product produced by unconditional acceptance of the product of a fully automated system.

If the author decides to use the edit tools, then a decision step 456 needs to be completed where the author chooses to use manual tools or fully automated tools.

When the decision (step 456) is made to use full automation as a tool (with the intention that editing will take place by the author selecting a final version from competing versions of the same node page) either alone or some combination with the other tools (step 458), then decision step 460 is engaged.

On the basis of decision step 460, the system takes a rules based approached (step 462) or a random approach (step 464). It should be noted that implicit in the system is the option of the authoring to choose the degree to which the product node page reflects systems rules principles of construction, manual intervention and random construction.

Decision step 466 reflects the ability of the author to choose which tools will be used to what degree as observed in the preceding paragraph.

If the decision to add more tools is made, the flow returns to step 456 and allows another tool to be added. The author has the option to go to decision step 468 to have the system present the node page contents in a variety of sample layouts (step 470). The author can also choose (decision step 472) to have the system provide templates (step 474) in a manner familiar to those versed in the art of using presentation preparation software. The system also offers the decision step 476 to turn on system provided hints and suggestions (step 478). It should be underlined that the implicit availability to the system of context based inferences enables a different quality to the application and functioning of these well known tools for production assistance.

Once the author has completed selecting the kind and mix of tools (decision step 466), the system will display the content for the node page and which will allow the author to interact with the node page content (step 480). Typical interactions are moving, deleting, and resizing the objects for layout purposes.

In addition, the system would offer the ability to alter node page content in accordance with decision step 482. It should be noted that the decision to alter the content (step 484) is again uniquely enhanced by the system since it can offer hints such as "alter the image of the Citroen car from blue to red and remove it from a background suggesting an American shopping mall to keep it in line with the context that has been inferred."

At any time, the author has the option of producing a draft that captures the current changes made to the product node page (step 486) and to compare that draft to other drafts they have generated (step 488).

Upon comparison of competing drafts, decision step 490 is reached which allows the author to declare the editing process complete and therefore to produce a final output (step 492) or to decide to return to step 480 with the intention of producing additional drafts of the product node page.

For example, given a narrative line transpiring in Paris, the system has compiled for offering to the author the standard contextual images such as maps of Paris, the most well know works of art and architecture, famous music of Paris, histories of the Eiffel tower, factual imagery which shows the height and weight of the Tower, pictures taken from the top of the Eiffel tower from long ago. The system may then co-display such images with the author's images in order to create dramatic contrast, pictures of the then Mayor, President of Paris, images of major news occurrences happening in that region at that time, and similar choices of the kind labeled general in this patent. It should be noted that by looking at the context as seen by the characters within the narrative, interesting associations can be identified (finding out that the mayor of Paris was in Notre Dame for the same service attended by the author.)

Additionally, system 20 may locate content data files that are general but not historic but of interest because of their ubiquity. For example, billboards or commercials that were common in a particular locale at a particular time for entertainment of products, styles of dress, matchbooks and cigarettes, a wine that was in season, automobiles, the ubiquitous gratings and wrought iron fences, food and popular music.

It is anticipated that as system 20 offers up additional content data files and narratives apropos the author's that the author's recollection will be stimulated and that new nodes will be added to the narrative. For example, images of the local streets may remind the author of story involving going into a bistro to get out of the rain or of getting lost in the park.

On the basis of the information in the databases already described and on the basis of the content data files and narratives chosen by the author, the system is well situated to recommend context data files that belong to the class of content data files described above generally as "local, that the author neglected to collect but which in retrospect add nuance and detail to the core narrative and which tie general media to the personal narrative. For example, the author may have eaten in the restaurant situated in the Eiffel Tower which prompts system 20 to search out and offer to the author photos of a copy of the menu from the restaurant, pictures of the fare, pictures of the chef and serving staff as well as the rooms, particularly if the system detects that there is a genealogical connection between the restaurant and members of the audience. Likewise, the system may locate and provide images or other content data files related to the liberation of Paris with the Eiffel tower in the background that may tie to a family history for the author, characters in the work of communication, performers or audience. Additionally, the system may offer up images taken from the top of the Eiffel Tower but pointing in the direction of the home of the author, characters/performers in the work of communication or audience. Many examples about—pictures of ticket takers, images of the Eiffel Tower compared to properly scaled images of local buildings, and so on as appropriate to the author, characters, performers and audience. If no appropriate pictures are available, potential the system could construct or modify content to suit the needs of local contextual elements.

It should be noted that system 20 as described may include sensors and devices such as cameras to note gaze direction, eye-tracking and other involuntary behaviors that allow it to respond to indications of interest, appeal or impact on the part of the author, characters, performers or audience and use that information to look ahead and anticipate searches and queries that should be made on the author's behalf without explicit direction from the author.

If the draft of the work of communication were deemed adequate by the author, then the final work of communication would be generated and stored or preformed.

Figure 21A:
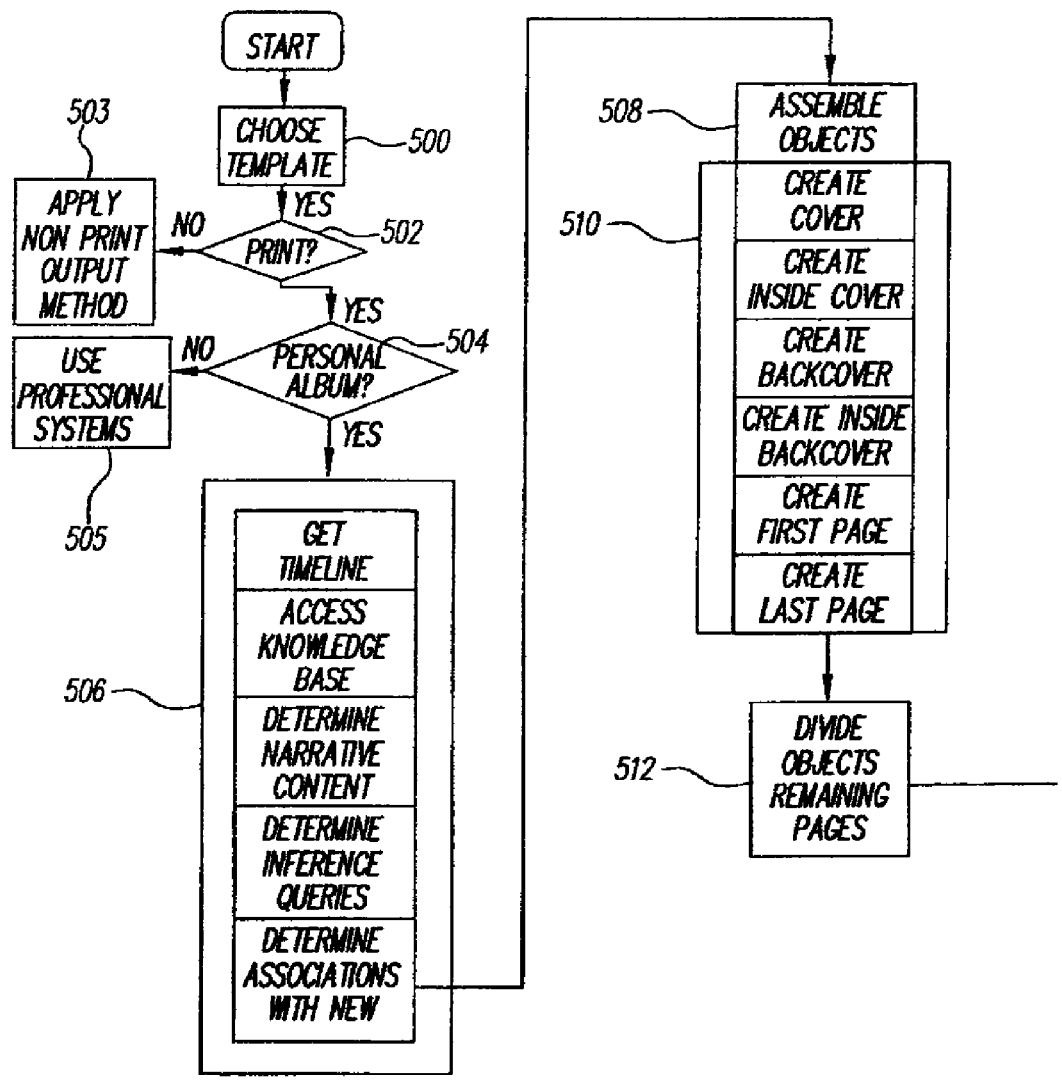
FIG. 21A-21B shows a flowchart depicting one embodiment of a method for generating a specific work of communication (a photo album).
Figure 21:
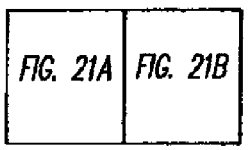
Figure 21B:
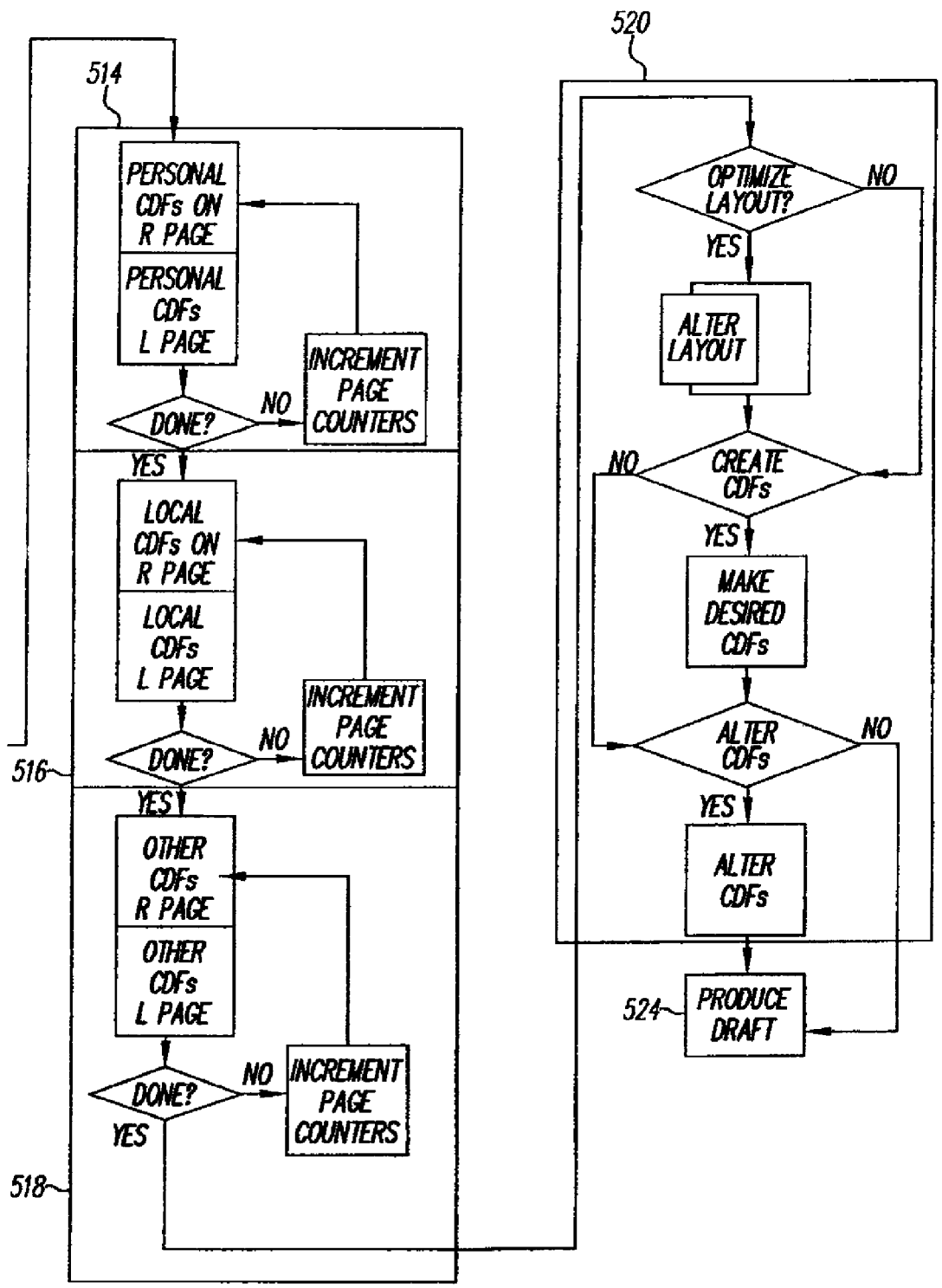

FIG. 21 shows a flowchart illustrating another method for generating a work of communication. In the example of FIG. 21, the method is described as it is used to generate a printed work of communication. Specifically, in this example embodiment, the discussion will describe the task of creating individual pages of the work of communication. However, it will be appreciated that the task of creating an individual page exists in the context of creating the overall work of communication. By way of illustration therefore, this discussion in FIG. 21 describes the use of the described method to assemble photo album pages and then set such pages within the larger context of a photo album and then use that context to further refine the selection of CDFs to be included on the page.

It should be noted in addition efficacy in stimulating a narrative and enhancing a work of communication, the method described in this disclosure useful in simplifying the production of the work of communication (which may include albums, books. comic books and graphic novels, web pages, electronic presentations of all sorts, video, films and performances).

As is illustrated in FIG. 21, the process begins with step 500, the choice of a photo album template. Next is decision step 502 where the author chooses to do a print version of a personal (step 504) photo album. It should be noted that the author can direct the system at any point in the process of generating the album or the album page (as shown in the FIG. 20).

The steps collectively referred to as step 506 refer to the process of accessing the context data file from which the inferential queries were derived. This data provides definition of the relations and mutual association of the content data files that will be displayed.

System 20 then reviews all the content data files and links to content data files for this product and assembles them in layout related categories (step 508).

Step 510 includes all the steps involved in calling up templates for the pages that have unique rules (front cover, back cover, inside cover pages, and the first and last pages) and using content data files inferred contextual associations to create the hints, suggestions and sample layouts for use by the author as illustrated in FIG. 21.

Step 512 takes the content data files that remain after the content data files preferred for pages with unique rules have been selected, and distributes those content data files across the main body of the print photo album. This can be done in keeping with inferred associations to the node. For example if the narrative line is one that whose nodes are sequential in time, then all content data files will be similarly organized around each node.

Step 514 recognizes that a personal photo album will present personal photos as the center of attention for each page. Consequently, the largest and optimally placed content data files will be the personal images associated with each node. Benefits of the system are that the inferred associations between personal images will allow the system to choose images that share context to be placed on facing pages of the album. This step is recursive until all personal images have been placed on all pages in keeping with the choices explicitly made by the author and the system inferred choices extracted from the personal knowledgebase and the product database.

This recursive approach is applicable to other works of communication and is not constrained to the problem of proper placement of personal images on facing pages, but the prioritization of the placement and other treatments of personal images in a work of communication having context data files.

Step 516 is identical to step 514, with the difference that the system populates areas of secondary visual importance with content data files whose relative significance characterizes them as "local" content data files are explained earlier in the disclosure. Again, inferred associations allow content data files of high relative significant to be chosen that would otherwise be deemed irrelevant other production systems.

Step 518 is identical to steps 516 and 514, but with the understanding that the content data files classified by system 20 as general will be best placed in the page areas of tertiary visual importance and will be of smaller size (or otherwise visually de-emphasized) compared to the personal and local content on the page.

Collective step 520 begins with the system offering the author the option of allowing the system to apply the principles of contextual inference to the potential product currently in system memory. As noted above, the author is given the option of manually overriding the system or choosing to mix manual and automated methods of constructing the product.

If the author accepts the offer, the system will then review all the associations and placement of content data files in the product and use contextual inference and other forms of analysis to identify gaps in the context that has been provided for the node and, on that basis, suggest pages, new page layouts and new context data files for those pages.

Step 524 has been addressed in detail in FIG. 21. It should be noted that in conjunction with step 520, the system offers the author the option of generating context data files that match the needs as defined in FIG. 13 and FIG. 19. For example the system locates a black 55 Citroen but the personal narrative calls for a red 55 Citroen. If allowed by the author, the system can automatically alter the local content data files to create a personal content data file that is original to the product. In addition, stylistic means may be used (rendering the altered or generated image) in a cartoon style or in black and white to distinguish from found content data files.

Step 524 is the final step of producing a draft of the entire photo album for author review.

In this case, we assume that the author has chosen a template where there: is one narrative node per print page; where 15 pages have been selected as the length; where resolution, size and stock have been selected; an overall style and the choice to have the content data files altered by the system to be consistent with the chosen style (modern) and all other aspects of assisted means of producing a work of communication as is commonly done by software such as PowerPoint, Excel and others too numerous to mention.

It will be appreciated that system 20 suggest additional context data files and by knowing they are context data files, treats them in a manner more appealing and convenient to the author, performers and stimulating to the audience. For example, typically a cover is meant to convey an overall sense of the contents of an album. In the past a generic scene is selected (for example using a stock photograph of the Eiffel Tower.) This system would allow an image of the author to be extracted from the background (because we know the value of such an image to the author and audience), and composited with images of Paris of local significance and composited with smaller images of general value in setting a Parisian context (sidewalk cafes, boulangeries, parks and monuments) along with text providing the title of the album.

The inside cover could then be generated. For example, a map of Paris could be overlayed with a line showing the progress of the author of the period of time covered by the album with a star indicating the location of where the primary media object was created—the place the large personal picture was taken.

The rear cover could then be generated. For example, the collage on the cover could be extended to the rear cover. The inside rear cover could also be constructed of a primary media object (such as a large, personal photo) related to departure (the author getting on an aircraft) with additional context data files (smaller images of a Parisian cab driver, sounds of French traffic, a final image of the skyline, of Orly International, a final French meal, a Parisian news headline of the day, an appropriate poem, etc). In this manner, knowledge of the significance and type of significance.

It should be pointed out that ubiquitous context data files (typical finishes on clothing, furniture, or decorating public and private spaces) might be useful in providing a background on each page. For example, a page of images from Beauborg might have a background reminiscent of 60's pop art prints and wallpaper. A page of images of Versailles might have a background that visually recalls the reign of Louis XIV.

The first page, like the cover and inside front and back pages and back cover pages, will likewise have specific rules. Like the cover, the page would feature a large personal image, titling, explanatory text and selection of local images of moderate size and general images of smaller size with all the images and text laid out in a manner appropriate to the relation and significance of the images. In addition, the choice of style and ubiquitous images will form a background, the total then open for final modification by the author.

The remaining pages between the first and last can then be assembled using the same principles where the number of pages chosen and the number of nodes chosen are reconciled by the chosen selection of templates and an appropriate number of nodes per page (where each node is any combination of personal or personally chosen printable content data files such as text, written music, photos, and artwork) along with the preferred style of layout (automated, hints, random, etc) and then offering to the author a selection of images and text to surround each node. As stated before, the system of this invention now has enough information (by knowing the degree and type of significance to the narrative, the author, performers and audience) to have a higher likelihood of doing an aesthetically pleasing layout relative to the audience and author. Aesthetic choices such as which printable content data files are to be placed on the periphery of the page or the less visually impactful locations on the page, which elements are more significant and should be placed in front of other print-able content data files, and to what degree they should be obscured, in conjunction with time and place information, can now be assayed.

In this example, the templates demonstrate handedness, in that the page layouts take advantage of the visual properties of the fully open album, that is the left and right pages are asymmetric as a page but symmetric when viewed together, and the printable content data files are assumed to be allowed to stretch across the left and right hand pages. For example a panoramic picture would be printed across both pages and allowed to bleed into the binder to provide impact.

It will be appreciated that system 20 can allow an author to make images, text, audio and other media elements available and the author would be assisted by the system in placing links on these objects and on the pages containing these objects to other context data files and webpages. In this case, system 20 could allow the audience to suggest additional links to other sites and the site could in turn be the object of other sites links. In this manner, the system would be "trained" to properly evaluate content data files by the audience as far as what the audience considers germane contextual elements, their significance and the type of element. The system of this invention in a networked environment benefits from the network in both improved numbers of content data files being available, the quality and number of the evaluations and in the richness of the linkages.

System 20 can be used to provide existing forms of works of communication and it can be used to enable relatively new forms. For example, in one embodiment system 20 can provide an author or performers with a narrative to follow in which the script prompts the author with content data files related to major nodes. In addition, system 2—offers up a constant stream of context data files to the author or performers, stimulating their recollection. For example, as a news announcer or performance artist speaks regarding a general topic, a presented content data file such as a media object can be provided and the news announcer or performance artist can select that content data file for display to the audience on a large that is behind the author, and then speaking improvisationally on the topic spurred by the context data file.

As is noted generally above, in certain embodiments, an audience is able to choose the context data files (on some sliding scale of control determined by the author and performers) and an averaging algorithm selects the CDF objects of greatest interest to a physically collocated or virtual, networked audience and presents that to the author(s) who then respond—basically coauthoring the experience with the audience and performers. This opens up the wider possibility of multiple coauthors improvising stories in what would be tantamount to a multimedia object improvisational session using different artistic disciplines. The dancer's narrative, the writer's, the filmmaker's, since they could all use the same underlying authoring system, could be used to shared recollection stimulating context data files and inspire each and the audience.

The system can be adapted to support any application are film making, video editing, soundtrack creation, book generation, comic book generation, cartoon creation, computer presentation, art gallery show design, architecture and so on. It is also clearly applicable to any form of a work of communication, historical, documentary, fictional and fantastical. Also any style is equally well supported.

The invention has been described in detail with particular reference to certain preferred embodiments thereof, but it will be understood that variations and modifications can be effected within the spirit and scope of the invention.

The invention claimed is:

1. A method implemented by an electronic system adapted to process content data files to form digital data representing a work of communication, the work of communication pertaining to a narrative, and the method comprising:

accessing a first set of content data files stored in a memory device accessible to the electronic system, the first set of content data files associated with the work of communication;

determining context indicators from at least some of the content data files in the first set based at least upon a set of rules for identifying the context indicators;

determining relative significances of at least some of the content data files of the first set to (a) a person associated with the work of communication, (b) a node of the narrative, or (c) both (a) and (b);

determining inference queries based at least upon the context indicators and the relative significances;

obtaining a second set of content data files greater than the first set from a source of content data files using at least the inference queries; and providing at least some of the content data files in the second set to be included in the digital data representing the work of communication, wherein the provided content data files are different than the content data files in the first set.

2. The method of claim 1, wherein the providing includes linking at least some of the provided content data files with a node of the narrative.

3. The method of claim 1, wherein the first set of content data files is associated with an author of the work of communication.

4. The method of claim 1, wherein the relative significances are determined at least with respect to the person associated with the work of communication.

5. The method of claim 1, wherein the relative significances are determined at least with respect to the person associated with the node of the narrative.

6. The method of claim 1, wherein the relative significances are determined at least with respect to the person associated with the work of communication, and wherein the person associated with the work of communication is an author of the work of communication, an audience member viewing the work of communication, or a performer of the work of communication.

7. The method of claim 6, wherein the person associated with the work of communication is an audience member viewing the work of communication over a network.

8. The method of claim 1, wherein the narrative comprises a sequence of nodes, wherein the first set of content data files are received over a period of time while an author of the work of communication is communicating the narrative and advancing through at least two of the nodes, and wherein the providing includes linking at least one of the provided content data files to one of the nodes and linking at least another of the provided content data files to a another of the nodes.

9. The method of claim 1, further comprising selecting the first set of rules from plural sets of rules based at least upon a relationship between the first set of rules and an author of the work of communication, a subject of the work of communication, a type of the work of communication, a manner in which the work of communication is used, or a manner of use of the work of communication.

10. The method of claim 1, further comprising monitoring audience reaction to the work of communication, wherein the obtaining obtains the second set of content data files using at least the inference queries and the audience reaction.

11. An electronic system adapted to process content data files to form digital data representing a work of communication, the work of communication pertaining to a narrative, and the system comprising:

a data processing system; and a memory device system communicatively connected to the data processing system and storing instructions configured to cause the data processing system to implement a method, wherein the instructions comprise:

instructions for accessing a first set of content data files stored in the memory device system accessible to the electronic system, the first set of content data files associated with the work of communication;

instructions for determining context indicators from at least some of the content data files in the first set based at least upon a set of rules for identifying the context indicators;

instructions for determining relative significances of at least some of the content data files of the first set to (a) a person associated with the work of communication, (b) a node of the narrative, or (c) both (a) and (b);

instructions for determining inference queries based at least upon the context indicators and the relative significances;

instructions for obtaining a second set of content data files greater than the first set from a source of content data files using at least the inference queries; and instructions for providing at least some of the content data files in the second set to be included in the digital data representing the work of communication, wherein the provided content data files are different than the content data files in the first set.

12. The system of claim 11, wherein instructions for providing include instructions for linking at least some of the provided content data files with a node of the narrative.

13. The system of claim 11, wherein the first set of content data files is associated with an author of the work of communication.

14. The system of claim 11, wherein the relative significances are determined at least with respect to the person associated with the work of communication.

15. The system of claim 11, wherein the relative significances are determined at least with respect to the person associated with the node of the narrative.

16. The system of claim 11, wherein the relative significances are determined at least with respect to the person associated with the work of communication, and wherein the person associated with the work of communication is an author of the work of communication, an audience member viewing the work of communication, or a performer of the work of communication.

17. The system of claim 16, wherein the person associated with the work of communication is an audience member viewing the work of communication over a network.

18. The system of claim 11, wherein the narrative comprises a sequence of nodes, wherein the first set of content data files are received over a period of time while an author of the work of communication is communicating the narrative and advancing through at least two of the nodes, and wherein the instructions for providing include instructions for linking at least one of the provided content data files to one of the nodes and linking at least another of the provided content data files to a another of the nodes.

19. The system of claim 11, further comprising instructions for selecting the first set of rules from plural sets of rules based at least upon a relationship between the first set of rules and an author of the work of communication, a subject of the work of communication, a type of the work of communication, a manner in which the work of communication is used, or a manner of use of the work of communication.

20. The system of claim 11, further comprising instructions for monitoring audience reaction to the work of communication, wherein the instructions for obtaining obtain the second set of content data files using at least the inference queries and the audience reaction.

* * * * *